United States Patent
Kim et al.

(10) Patent No.: US 11,503,542 B2
(45) Date of Patent: Nov. 15, 2022

(54) METHOD AND APPARATUS FOR REDUCING POWER CONSUMPTION OF TERMINAL IN WIRELESS COMMUNICATION SYSTEM

(71) Applicant: Samsung Electronics Co., Ltd., Gyeonggi-do (KR)

(72) Inventors: Taehyoung Kim, Gyeonggi-do (KR); Heedon Gha, Gyeonggi-do (KR); Jinkyu Kang, Gyeonggi-do (KR); Youngbum Kim, Gyeonggi-do (KR); Seunghoon Choi, Gyeonggi-do (KR)

(73) Assignee: Samsung Electronics Co, , Ltd

( * ) Notice: Subject to any disclaimer, the term of this patent is extended or adjusted under 35 U.S.C. 154(b) by 85 days.

(21) Appl. No.: 17/130,714

(22) Filed: Dec. 22, 2020

(65) Prior Publication Data
US 2021/0195523 A1    Jun. 24, 2021

(30) Foreign Application Priority Data
Dec. 24, 2019    (KR) .................. 10-2019-0174352

(51) Int. Cl.
*H04W 72/04* (2009.01)
*H04W 52/02* (2009.01)

(52) U.S. Cl.
CPC ..... *H04W 52/0225* (2013.01); *H04W 72/042* (2013.01)

(58) Field of Classification Search
CPC .......... H04W 52/0216; H04W 72/042; H04W 72/1289; H04W 52/0241; H04W 36/06; H04W 72/0453; H04W 76/27; H04W 52/0225; H04L 5/0098; H04L 5/001; H04L 5/0053
See application file for complete search history.

(56) References Cited

U.S. PATENT DOCUMENTS

| 2018/0242319 A1 | 8/2018 | Akkarakaran et al. |
| 2020/0029316 A1* | 1/2020 | Zhou .................. H04W 72/042 |

(Continued)

FOREIGN PATENT DOCUMENTS

| EP | 3 809 762 | 4/2021 |
| WO | WO 2018/085145 | 5/2018 |

OTHER PUBLICATIONS

Ericsson, "Summary#4 of Efficient and Low Latency Serving Cell Configuration/Activation/Setup", R1-1913549, 3GPP TSG-RAN WG1 #99, Nov. 18-22, 2019, 25 pages.

(Continued)

*Primary Examiner* — Chi Ho A Lee
(74) *Attorney, Agent, or Firm* — The Farrell Law Firm, P.C.

(57) ABSTRACT

The disclosure relates to a communication scheme and system for convergence between an IoT technology and a 5G communication system for supporting a higher data transfer rate beyond a 4G system. The disclosure may be applied to intelligent services (e.g. smart home, smart building, smart city, smart car or connected car, health care, digital education, retail business, and security and safety-related services), based on a 5G communication technology and an IoT-related technology. In addition, the disclosure provides a method and an apparatus for reducing the power consumption of a terminal in a wireless communication system.

16 Claims, 9 Drawing Sheets

(56) References Cited

U.S. PATENT DOCUMENTS

| | | | |
|---|---|---|---|
| 2020/0059345 A1 | 2/2020 | Pelletier et al. | |
| 2020/0145164 A1* | 5/2020 | Cheng | H04W 52/265 |
| 2020/0313833 A1* | 10/2020 | Yi | H04W 72/1289 |
| 2020/0351738 A1* | 11/2020 | Huang | H04W 36/06 |
| 2021/0029772 A1* | 1/2021 | Islam | H04W 76/27 |
| 2021/0051640 A1* | 2/2021 | Pao | H04W 76/27 |
| 2021/0176030 A1* | 6/2021 | Tsai | H04W 72/042 |
| 2021/0203468 A1* | 7/2021 | Yi | H04W 72/0453 |
| 2021/0377852 A1* | 12/2021 | Zhou | H04W 76/28 |
| 2021/0392651 A1* | 12/2021 | Futaki | H04W 24/10 |
| 2022/0116878 A1* | 4/2022 | Koskinen | H04W 76/28 |

OTHER PUBLICATIONS

European Search Report dated Jan. 20, 2022 issued in counterpart application No. 20905105.1-1212, 13 pages.

Vivo, "Fast Scell Activation and Dormancy like Behavior", R1-1912055, 3GPP TSG RAN WG1 #99, Nov. 18-22, 2019, 9 pages.

Ericsson, "Reduced Latency Scell Managment for NR CA", R1-1912786, 3GPP TSG-RAN WG1 #99, Nov. 18-22, 2019, 6 pages.

Qualcomm Incorporated, "SCell Dormancy and Fast SCell Activation", R1-1912980, 3GPP TSG-RAN WG1 #99, Nov. 18-22, 2019, 13 pages.

International Search Report dated Mar. 15, 2021 issued in counterpart application No. PCT/KR2020/018866, 7 pages.

* cited by examiner

METHOD AND APPARATUS FOR REDUCING POWER CONSUMPTION OF TERMINAL IN WIRELESS COMMUNICATION SYSTEM

CROSS-REFERENCE TO RELATED APPLICATION(S)

This application is based on and claims priority under 35 U.S.C. § 119 to Korean Patent Application No. 10-2019-0174352, filed on Dec. 24, 2019, in the Korean Intellectual Property Office, the disclosure of which is incorporated by reference herein in its entirety.

BACKGROUND

1. Field

The disclosure relates generally to a method and an apparatus for reducing the power consumption of a terminal in a wireless communication system.

2. Description of Related Art

To meet the increased demand for wireless data traffic since deployment of fourth generation (4G) communication systems, efforts have been made to develop an improved fifth generation (5G-) or pre-5G communication system. Therefore, the 5G or pre-5G communication system is also called a "beyond 4G network" or a "Post Long-Term Evolution System (LTE)". The 5G communication system is considered to be implemented in higher frequency millimeter wave (mmWave) bands, e.g., 60 gigahertz (GHz) bands, so as to accomplish higher data rates. To decrease propagation loss of the radio waves and increase the transmission distance, beamforming techniques, massive multiple-input multiple-output (MIMO) techniques, full dimensional MIMO (FD-MIMO) techniques, array antenna techniques, analog beam forming techniques, and large scale antenna techniques are discussed in 5G communication systems. In addition, in 5G communication systems, developments for system network improvement is under way based on advanced small cells, cloud radio access networks (RANs), ultra-dense networks, device-to-device (D2D) communication, wireless backhaul technology, moving network technology, cooperative communication technology, coordinated multi-points (CoMP) technology, and reception-end interference cancellation technology. In the 5G system, hybrid frequency shift keying (FSK) and quadrature amplitude modulation (QAM) (FQAM) technology, sliding window superposition coding (SWSC) as an advanced coding modulation (ACM) technology, filter bank multi carrier (FBMC) technology, non-orthogonal multiple access (NOMA) technology, and sparse code multiple access (SCMA) as an advanced access technology have also been developed.

The Internet is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication network, and a machine type communication (MTC) network, have been recently researched. Such an IoT environment may provide intelligent Internet technology services that create a new value to human life by collecting and analyzing data generated among connected things. IoT may be applied to a variety of fields including smart home fields, smart building fields, smart city fields, smart car or connected car fields, smart grid fields, health care fields, smart appliance fields and advanced medical service fields through convergence and combination between existing information technology (IT) and various industrial applications.

Various attempts have been made to apply 5G communication systems to IoT networks. For example, technologies such as a sensor network technologies, MTC technologies, and M2M communication technologies may be implemented by beamforming, MIMO, and array antennas. Application of a cloud radio access network (RAN), as the above-described big data processing technology, may also be considered an example of convergence of the 5G technology with the IoT technology.

In view of the above description, and considering the fact that various services can be provided as a result of the development of wireless communication systems, a scheme for efficiently providing such services is needed. Particularly, there is a need for a communication method in which power consumed by terminals can be reduced in order to provide users with services for a longer period of time.

SUMMARY

The present disclosure has been made to address the above-mentioned problems and disadvantages, and to provide at least the advantages described below.

In accordance with an aspect of the disclosure, a method performed by a terminal is provided. The method includes receiving, from a base station, information on a dormant bandwidth part (BWP) for a secondary cell; receiving, from the base station, downlink control information (DCI); and identifying information associated with a dormancy for the secondary cell based on an information field included in the DCI, in case the DCI satisfies a predetermined condition, wherein an active BWP for the secondary cell is identified based on the information associated with the dormancy for the secondary cell, and wherein monitoring of a physical downlink control channel (PDCCH) is not performed by the terminal in case that the identified active BWP is the dormant BWP.

In accordance with another aspect of the disclosure, a terminal is provided. The terminal includes a transceiver; and a controller configured to receive, from a base station, information on a dormant BWP for a secondary cell; receive, from the base station, DCI; and identify information associated with a dormancy for the secondary cell based on an information field included in the DCI, in case the DCI satisfies a predetermined condition, wherein an active BWP for the secondary cell is identified based on the information associated with the dormancy for the secondary cell, and wherein monitoring of a PDCCH is not performed by the terminal in case that the identified active BWP is the dormant BWP.

In accordance with another aspect of the disclosure, a method performed by a base station is provided. The method includes transmitting, to a terminal, information on a dormant BWP for a secondary cell; and transmitting, to the terminal, DCI; wherein an information field included in the DCI is related to information associated with a dormancy for the secondary cell, in case the DCI satisfies a predetermined condition, wherein an active BWP for the secondary cell is based on the information associated with the dormancy for the secondary cell, and wherein monitoring of a PDCCH is not performed by the terminal in case that the identified active BWP is the dormant BWP.

In accordance with another aspect of the disclosure, a base station is provided. The base station includes a transceiver; and a controller configured to transmit, to a terminal, information on a dormant BWP for a secondary cell; and transmit, to the terminal, DCI; wherein an information field included in the DCI is related to information associated with a dormancy for the secondary cell, in case the DCI satisfies a predetermined condition, wherein an active BWP for the secondary cell is based on the information associated with the dormancy for the secondary cell, and wherein monitoring of a PDCCH is not performed by the terminal in case that the identified active BWP is the dormant BWP.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
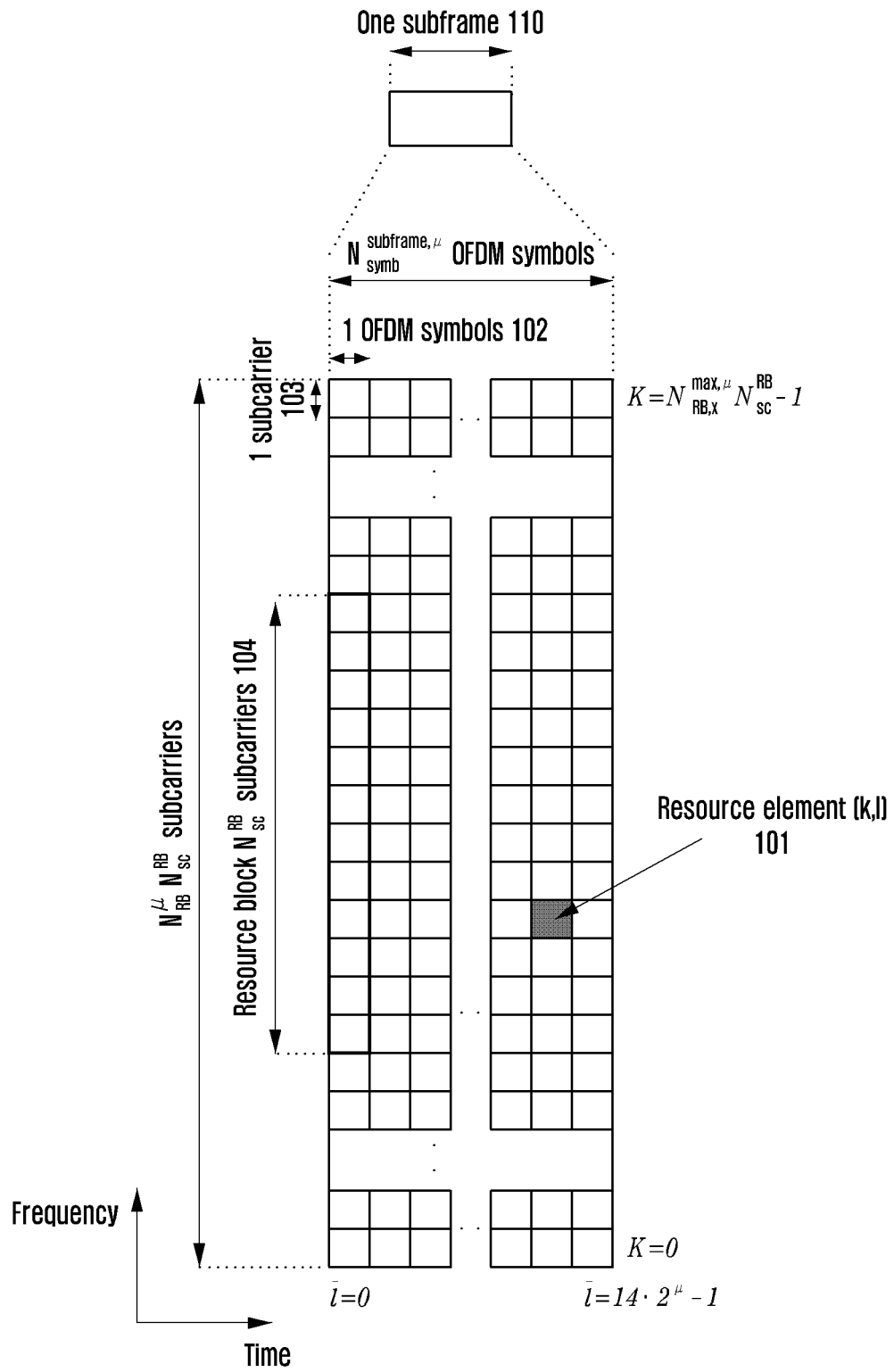
FIG. 1 illustrates a basic structure of a time-frequency domain of a 5G system, according to an embodiment.

An embodiment of the present disclosure seeks to provide a communication method and an apparatus for reducing power consumed by a terminal in a wireless communication system.

Hereinafter, embodiments will be described in detail with reference to the accompanying drawings.

In describing embodiments of the disclosure, descriptions related to technical contents well-known in the art and not associated directly with the disclosure may be omitted. Such an omission of unnecessary descriptions is intended to prevent obscuring of the main idea of the disclosure and more clearly convey the main idea.

For the same reason, in the accompanying drawings, some elements may be exaggerated, omitted, or schematically illustrated. Further, the size of each element may not completely reflect the actual size. In the drawings, identical or corresponding elements may be provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art, and the disclosure is defined only by the scope of the appended claims. Throughout the specification, the same or like reference numerals may designate the same or like elements.

Hereinafter, a base station is configured to perform resource allocation to a terminal, and may be one of a gNode B, an eNode B, a Node B, a base station, a wireless access unit, a base station controller, or a node on a network. A terminal may include a user equipment (UE), a mobile station (MS), a cellular phone, a smartphone, a computer, or a multimedia system capable of a communication function. In the disclosure, downlink (DL) denotes a wireless transmission path of a signal transmitted by a base station to a terminal, and uplink (UL) denotes a wireless transmission path of a signal transmitted by a terminal to a base station. In addition, hereinafter, although an LTE, LTE-Advanced (LTE-A), or 5G system may be described, an embodiment may be also applied to communication systems having a similar technical background or channel type. For example, the other communication systems may include a 5G mobile communication technology new radio (NR) technology developed after LTE-A, and 5G described below may also be a concept including a conventional LTE and LTE-A and other services similar thereto. In addition, the disclosure may be also applied to another communication system through partial modification without departing too far from the scope of the disclosure according to the determination of a person skilled in the art.

Here, it will be understood that each block of the flowchart illustrations, and combinations of blocks in the flowchart illustrations, can be implemented by computer program instructions. These computer program instructions can be provided to a processor of a general purpose computer, a special purpose computer, or a programmable data processing apparatus to produce a machine, such that instructions, which are executed via the processor of the computer or the programmable data processing apparatus, create a means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including an instruction means that implements the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, a "unit" refers to a software element or a hardware element, such as a field programmable gate array (FPGA) or an application specific integrated circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, databases, data structures, tables, arrays, and parameters. The elements and functions provided by the "unit" may either be combined into a smaller number of elements, or a "unit", or divided into a larger number of elements, or a "unit". Moreover, the elements and "units" or may be implemented to reproduce one or more central processing units (CPUs) within a device or a security multimedia card. Further, the "unit" in the embodiments may include one or more processors.

A wireless communication system has been developed to be a broadband wireless communication system that provides a high speed and high quality packet data service, such as high speed packet access (HSPA), LTE, evolved universal terrestrial radio access (E-UTRA)), LTE-A, and LTE-Pro of $3^{rd}$ Generation Partnership Project (3GPP), high rate packet data (HRPD), and ultra mobile broadband (UMB) of 3GPP 2 (3GPP2), and 802.16e of the Institute of Electrical and Electronics Engineers (IEEE). These services provide communication abilities beyond the voice-based service provided at the initial stage.

An LTE system, which is a representative example of the broadband wireless communication system, employs an orthogonal frequency division multiplexing (OFDM) scheme for a downlink, and employs a single carrier frequency division multiple access (SC-FDMA) scheme for an uplink. Uplink denotes a wireless link for transmitting data or a control signal by a terminal (a UE or an MS) to a base station (an eNode B), and downlink denotes a wireless link for transmitting data or a control signal by a base station to a terminal. In the multiple access schemes described above, time-frequency resources for carrying data or control information may be allocated and managed in a manner to prevent overlapping of the resources between users, i.e. to establish the orthogonality, so as to identify data or control information of each user.

A future communication system after LTE, that is, a 5G communication system, may be required to conveniently adhere to various requests from a user and/or a service provider, and thus support a service satisfying all the various requirements. Services considered for 5G communication systems may include enhanced mobile broadband (eMBB), massive machine type communication (mMTC), and ultra-reliability low-latency communication (URLLC).

The purpose of eMBB is to provide a data rate faster than a data rate supported by the conventional LTE, LTE-A, or LTE-Pro. For example, in a 5G communication system, eMBB may be required to provide a peak data rate of 10 gigabits per second (Gbps) for uplink and a peak data rate of 20 Gbps for downlink in view of a single base station. Also, the 5G communication system may be required to provide the peak data rates and an increased user perceived data rate of a terminal. In order to satisfy the requirements described above, a 5G communication system may require the improvement of various transmission/reception technologies including further enhanced MIMO transmission technology. In addition, while LTE uses, for the transmission of a signal, a maximum transmission bandwidth of 20 megahertz (MHz) in a band of 2 GHz used by LTE, a 5G communication system uses a frequency bandwidth greater than 20 MHz in a frequency band of 3-6 GHz or a frequency band of 6 GHz or greater to satisfy a data transfer rate required for the 5G communication system.

Meanwhile, in a 5G communication system, mMTC has been considered to support application services such as the IoT. mMTC may require the support of a massive terminal connection in a cell, the improvement of terminal coverage, an improved battery life, or a terminal cost reduction in order to efficiently provide the IoT. Since the IoT is mounted in various sensors and devices to provide communication functions, mMTC may be required to support a large number of terminals (e.g. 1,000,000 terminals/square kilometer (km2)) in a cell. Also, a terminal supporting mMTC may require a wider coverage compared to other services provided in a 5G communication system because it is highly probable that the terminal is disposed in a radio shadow area, such as the basement of a building which a cell fails to cover due to the nature of the mMTC service. It may be necessary for a terminal supporting mMTC to be inexpensive and have a very long battery life, for example, 10 to 15 years, because it is hard to frequently change the battery of the terminal.

Lastly, URLLC is a cellular-based wireless communication service which may be used for a mission-critical purpose. Services used to remotely control robots or machinery, industrial automation devices, unmanned aerial vehicles, remote health care devices, or emergency alerts may be considered for URLLC. Therefore, communication provided by URLLC may be required to provide very low latency and very high reliability. A service supporting URLLC may be required to satisfy a wireless connection latency time (i.e., an air interface latency) smaller than 0.5 milliseconds and a packet error rate of $10^{-5}$ or smaller at the same time. Therefore, for services supporting URLLC, a 5G system may require a design for providing a transmission time interval (TTI) shorter than those of other services and allocating a wide domain of resources in a frequency band to secure the reliability of a communication link.

Three services of 5G, that is, eMBB, URLLC, and mMTC, may be multiplexed and then transmitted in a single system. In order to satisfy different requirements of the services, different transmission/reception schemes and different transmission/reception parameters may be used for the services. However, 5G is not limited to the three aforementioned services.

Hereinafter, a frame structure of a 5G system will be described in detail with reference to the drawings.

FIG. 1 illustrates a basic structure of a time-frequency domain that is a wireless resource region in which data or a control channel is transmitted, in a 5G system, according to an embodiment.

In FIG. 1, the transverse axis indicates a time domain, and the longitudinal axis indicates a frequency domain. In the time-frequency domain, a basic unit of a resource may be defined as a resource element (RE) 101, that is, one OFDM symbol 102 in a time axis and one subcarrier 103 in a frequency axis. In the frequency domain, an $N_{SC}^{RB}$ number (e.g. 12) of consecutive REs may configure a single resource block (RB) 104.

Figure 2:
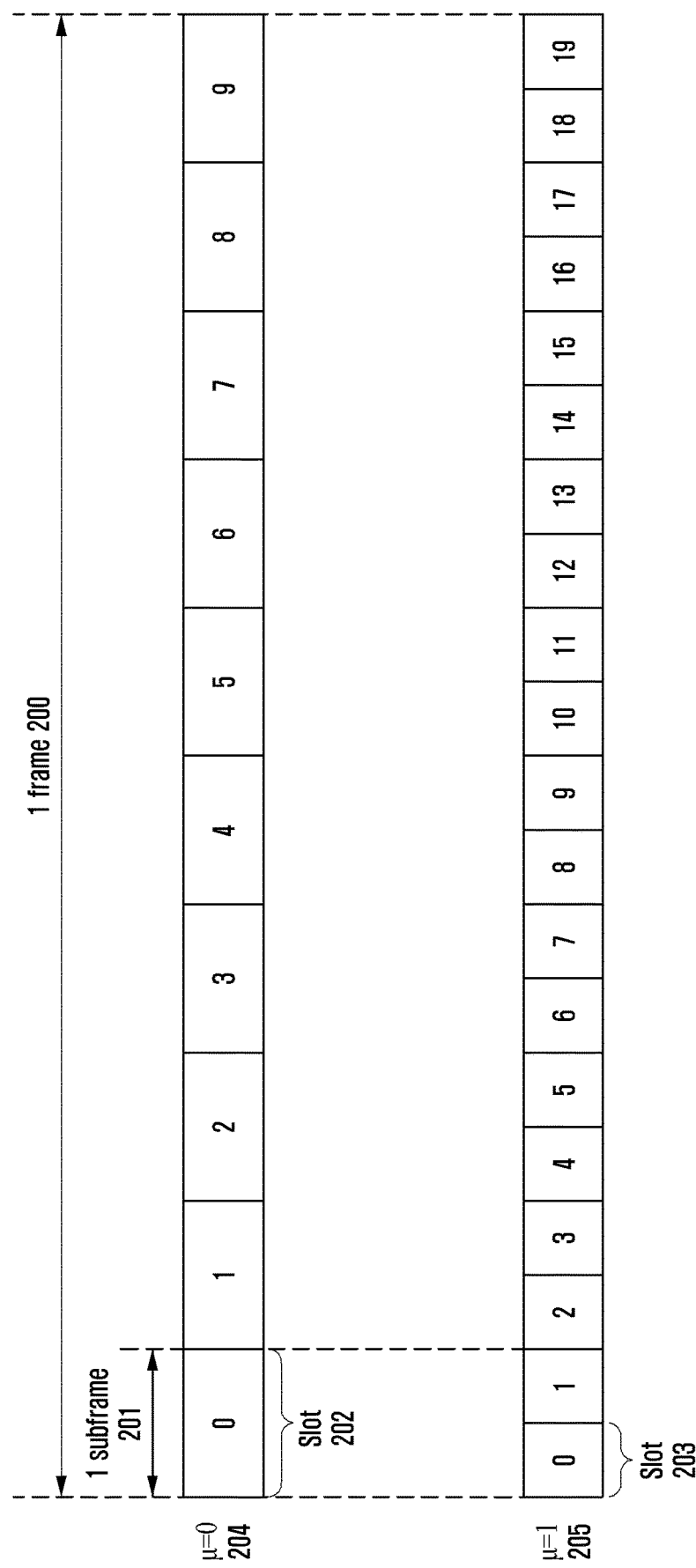
FIG. 2 illustrates frame, subframe, and slot structures of a 5G system according to an embodiment.

FIG. 2 illustrates a slot structure considered in a 5G system, according to an embodiment.

FIG. 2 illustrates an example of a structure of a frame 200, a subframe 201, a first slot 202 and a second slot 203. One frame 200 may be defined as 10 milliseconds. One subframe 201 may be defined as 1 millisecond, and thus one frame 200 may be configured by a total of 10 subframes 201. The first slot 202 and/or the second slot 203 may be defined as 14 OFDM symbols (i.e. the number ($N_{symb}^{slot}$) of symbols per one slot=14). One subframe 201 may be configured by the first slot 202 and/or the second slot 203, and the number of slots per one subframe 201 may be different according to a configuration value μ 204 and/or a configuration value μ 205 of subcarrier spacing. FIG. 2 illustrates an example in which a subcarrier spacing configuration value μ is 0 (the case indicated by reference numeral 204), and a subcarrier spacing configuration value μ is 1 (the case indicated by reference numeral 205). If μ 204 is 0, one subframe 201 may be configured by one slot 202, and if μ 205 is 1, one subframe 201 may be configured by two slots 203. That is, the number ($N_{slot}^{subframe,\mu}$) of slots per one subframe may be different according to a configuration value μ of a subcarrier spacing, and according thereto, the number ($N_{slot}^{frame,\mu}$) of slots per one frame may be different. $N_{slot}^{subframe,\mu}$ and $N_{slot}^{frame,\mu}$ according to each subcarrier spacing configuration μ may be defined as shown below in Table 1.

TABLE 1

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

Next, a BWP configuration in a 5G communication system will be described in detail with reference to the drawings.

Figure 3:
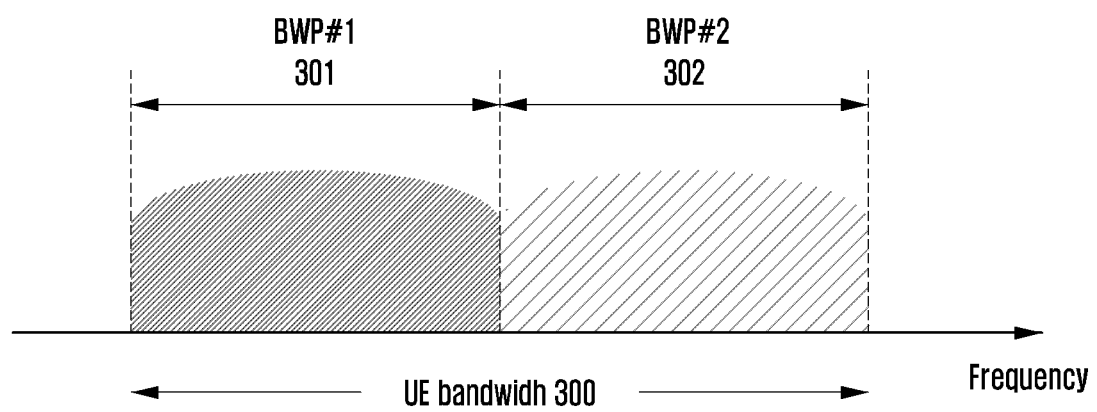
FIG. 3 illustrates an example of a BWP configuration of a 5G system, according to an embodiment.

FIG. 3 illustrates an example of a configuration of a BWP in a 5G communication system, according to an embodiment.

FIG. 3 illustrates an example in which a terminal bandwidth (a UE bandwidth) 300 is configured to be divided into two BWPs, that is, BWP #1 301 and BWP #2 302. A base station may configure one BWP or multiple BWPs for a terminal and may configure pieces of information for each BWP as shown below in Table 2.

TABLE 2

```
BWP ::= SEQUENCE {
  bwp-Id BWP-Id,
  (BWP identifier)
  locationAndBandwidth INTEGER (1..65536),
  (BWP location)
  subcarrierSpacing ENUMERATED {n0, n1, n2, n3, n4, n5},
  (Subcarrier spacing)
  cyclicPrefix ENUMERATED { extended }
  (Cyclic prefix)
}
```

However, the disclosure is not limited to the example shown in Table 2. In addition to the pieces of configuration information described above, various parameters related to a BWP may be configured for the terminal. The pieces of information may be transferred by the base station to the terminal through higher layer signaling, for example, radio resource control (RRC) signaling. At least one BWP among the configured one BWP or multiple BWPs may be activated. Whether the configured BWP is activated may be semi-statically transferred from the base station to the terminal through RRC signaling, or dynamically transferred through DCI.

An initial BWP for an initial access may be configured for the terminal before an RRC connection by the base station through a master information block (MIB). More specifically, a terminal may receive configuration information relating to a CORESET and a search space, in which a PDCCH may be transmitted, the PDCCH being designed for the terminal to receive system information (the system information may correspond to remaining system information (RMSI) or system information block 1 (SIB1)) required for an initial access through an MIB in an initial access stage. A CORESET and a search space that are configured through an MIB may be assumed to be identifiers (identities (IDs)). The base station may notify the terminal of configuration information such as frequency allocation information, time allocation information, and numerology for a CORESET #0 through an MIB. In addition, the base station may notify, through an MIB, the terminal of configuration information relating to a monitoring period and occasion for CORESET #0, that is, configuration information relating to search space #0. The terminal may consider a frequency region configured to be CORESET #0 obtained from an MIB, as an initial BWP for an initial access. The ID of the initial BWP may be considered to be 0.

The BWP configuration supported by 5G may be used for various purposes.

If a bandwidth supported by the terminal is smaller than a system bandwidth, the terminal may be supported through the BWP configuration. For example, the base station may configure the frequency location (configuration information 2) of a BWP for the terminal so that the terminal transmits or receives data at a particular frequency location in a system bandwidth.

In addition, the base station may configure a plurality of BWPs for a terminal in order to support different numerologies. For example, in order to support, to/from a terminal, both data transmission/reception using a subcarrier spacing of 15 KHz and data transmission/reception using a subcarrier spacing of 30 KHz, the base station may configure, for the terminal, two BWPs having a subcarrier spacing of 15 KHz and a subcarrier spacing of 30 KHz, respectively. Different BWPs may undergo frequency division multiplexing (FDM), and if the terminal and the base station are to transmit or receive data using a particular subcarrier spacing, a BWP configured to have the subcarrier spacing may be activated.

In addition, the base station may configure BWPs having different bandwidths for the terminal in order to reduce the power consumption of the terminal. For example, if the terminal supports a very wide bandwidth, for example, a bandwidth of 100 MHz, and always transmits or receives data through the bandwidth, the terminal may consume a very large quantity of power. Particularly, unnecessary monitoring of a downlink control channel in a large bandwidth of 100 MHz under no traffic may be very inefficient in view of power consumption. In order to reduce the power consumption of a terminal, the base station may configure a BWP having a relatively small bandwidth, for example, a BWP having 20 MHz, for the terminal. If there is no traffic, the terminal may monitor a 20 MHz BWP, and if data is generated, the terminal may transmit or receive the data through a 100 MHz BWP according to an indication of the base station.

In relation to a method configuring a BWP described above, terminals, before communication via an RRC connection, may receive configuration information of an initial BWP through an MIB in an initial access stage. More specifically, a CORESET for a downlink control channel through which DCI scheduling an SIB can be transmitted may be configured for the terminal through an MIB of a physical broadcast channel (PBCH). The bandwidth of the CORESET configured by the MIB may be considered as an initial BWP, and the terminal may receive a physical downlink shared channel (PDSCH) through which the SIB is transmitted, through the configured initial BWP. An initial BWP may be used for other system information (OSI), paging, and random access in addition to the reception of a SIB.

If one or more BWPs are configured for the terminal, the base station may instruct the terminal to change a BWP, by using a BWP indicator field in the DCI. For example, in FIG. 3, if a currently activated BWP of the terminal is BWP #1 301, the base station may indicate BWP #2 302 for the terminal through a BWP indicator in DCI, and the terminal may change the BWP to BWP #2 302 indicated by the BWP indicator in the received DCI.

As described above, a BWP change based on DCI may be indicated by DCI scheduling a PDSCH or a PUSCH, and thus if a terminal receives a BWP change request, the terminal is required to smoothly transmit or receive the PDSCH or PUSCH scheduled by the DCI in a changed BWP. To this end, a standard prescribes a requirement for a latency time interval ($T_{BWP}$) required for a BWP change, and the requirements may be defined, for example, as shown below in Table 3.

TABLE 3

| μ | NR Slot length (milli-seconds) | BWP switch delay $T_{BWP}$ (slots) | |
|---|---|---|---|
| | | Type 1[Note 1] | Type 2[Note 1] |
| 0 | 1 | [1] | [3] |
| 1 | 0.5 | [2] | [5] |
| 2 | 0.25 | [3] | [9] |
| 3 | 0.125 | [6] | [17] |

Note 1:
Depends on UE capability.
Note 2:
If the BWP switch involves changing of SCS, the BWP switch delay is determined by the larger one between the SCS before BWP switch and the SCS after BWP switch.

The requirements for a BWP change latency time interval may support type 1 or type 2 according to the capability of the terminal. The terminal may report a supportable type of BWP latency time interval to the base station.

According to the above requirement for BWP change latency time interval, if the terminal receives DCI including a BWP change indicator in slot n, the terminal may complete changing to a new BWP indicated by the BWP change indicator at a time point not later than slot n+$T_{BWP}$, and transmit or receive a data channel scheduled by the DCI in the changed new BWP. If the base station is to schedule a data channel in a new BWP, the base station may determine time domain resource allocation for the data channel in consideration of a BWP change latency time interval ($T_{BWP}$) of the terminal. That is, in a method of determining time domain resource allocation for a data channel when the base station schedules the data channel in a new BWP, the data channel may be scheduled after a BWP change latency time interval. Accordingly, the terminal may not expect that DCI indicating a change of a BWP indicates a slot offset (K0 or K2) value smaller than a BWP change latency time interval ($T_{BWP}$).

If the terminal receives DCI (e.g. DCI format 1_1 or 0_1) indicating a change of a BWP, the terminal may not perform any transmission or reception during a time interval from the third symbol of a slot receiving a PDCCH including the DCI to the starting point of a slot indicated by a slot offset (K0 or K2) value indicated by a time domain resource allocation indicator field in the DCI. For example, if the terminal receives a DCI indicating a change of a BWP in slot n, and a slot offset value indicated by the DCI is K, the terminal may not perform any transmission or reception during a time interval from the third symbol of slot n to the symbol before slot n+K (i.e. the last symbol of slot n+K−1).

Next, a synchronization signal (SS)-PBCH block in 5G is described.

An SS/PBCH block may denote a physical layer channel block including a primary SS (PSS), a secondary SS (SSS), and a PBCH. A PSS may be a signal serving as a criterion of downlink time/frequency synchronization, and provide partial information of a cell ID. An SSS may be a signal serving as a criterion of downlink time/frequency synchronization, and provide the remaining cell ID information which is not provided by a PSS. Additionally, an SSS may serve as a reference signal for demodulation of a PBCH. A PBCH may provide essential system information required for transmission/reception for a data channel and a control channel of a terminal. The essential system information may include search space-related control information indicating wireless resource mapping information of a control channel, and scheduling control information relating to a separate data channel through which system information is transmitted. An SS/PBCH block may be configured by a combination of a PSS, an SSS, and a PBCH. One or multiple SS/PBCH blocks may be transmitted within a time of 5 milliseconds, and each transmitted SS/PBCH block may be identified by an index.

The terminal may detect a PSS and an SSS in an initial access stage, and may decode a PBCH. The terminal may obtain MIB from the PBCH, and CORESET #0 (this may correspond to a CORESET having a CORESET index of 0) may be configured for the terminal from the MIB. The terminal may monitor CORESET #0 under the assumption that an SS/PBCH block selected by the terminal and a demodulation reference signal (DMRS) transmitted in CORESET #0 are quasi-co-located (QCL). The terminal may receive system information through DCI transmitted in CORESET #0. The terminal may obtain random access channel (RACH)-related configuration information for initial access from the received system information. The terminal may transmit a physical RACH (PRACH) to the base station in consideration of the selected SS/PBCH index, and the base station that received the PRACH may obtain information relating to the index of the SS/PBCH block selected by the terminal. The base station may identify that the terminal selects a block among SS/PBCH blocks, and monitor CORESET #0 associated with the block.

In the following description, DCI in a 5G system will be explained in detail.

In a 5G system, scheduling information on uplink data (or a physical uplink data channel or a PUSCH) or downlink data (or a physical downlink data channel or a PDSCH) is transferred through DCI from a base station to a terminal. The terminal may monitor a fallback DCI format and a non-fallback DCI format for a PUSCH or a PDSCH. The fallback DCI format may be configured by a fixed field pre-defined between a base station and a terminal, and the non-fallback DCI format may include a configurable field.

DCI may undergo a channel coding and modulation process, and then be transmitted through a PDCCH. A cyclic redundancy check (CRC) may be attached to a DCI message payload, and the CRC may be scrambled by a radio network temporary identifier (RNTI) corresponding to the identity of the terminal. Different types of RNTIs may be used according to the purpose of a DCI message, for example, terminal (UE)-specific data transmission may be used, a power control command may be used, or a random access response may be used. That is, an RNTI may not be explicitly transmitted, and may be transmitted after being included in a CRC calculation process. If the terminal has received a DCI message transmitted on a PDCCH, the terminal may identify a CRC by using an assigned RNTI, and if a CRC identification result is correct, the terminal may identify that the message has been transmitted to the terminal.

For example, DCI scheduling a PDSCH for system information (SI) may be scrambled by a SI-RNTI. DCI scheduling a PDSCH for a random access response (RAR) message may be scrambled by a RA-RNTI. DCI scheduling a PDSCH for a paging message may be scrambled by a P-RNTI. DCI notifying of a slot format indicator (SFI) may be scrambled by a SFI-RNTI. DCI notifying of a transmit power control (TPC) may be scrambled by a TPC-RNTI. DCI scheduling a terminal-specific PDSCH or PUSCH may be scrambled by a cell RNTI (C-RNTI).

DCI format 0_0 may be used for fallback DCI scheduling a PUSCH, and in this case, a CRC may be scrambled by a C-RNTI. DCI format 0_0 having a CRC scrambled by a C-RNTI may include, for example, the information shown in Table 4, below.

TABLE 4

Identifier for DCI formats-1 bit
  The value of this bit field is always set to 0,
  indicating an UL DCI format
Frequency domain resource assignment - $\lceil \log_2(N_{RB}^{UL,BWP}( N_{RB}^{UL,BWP} + 1)/2 ) \rceil$ bits where $N_{RB}^{UL,BWP}$ is defined in subclause 7.3.1.0
  For PUSCH hopping with resource allocation type 1:
    $N_{UL\_hop}$ MSB bits are used to indicate the frequency offset according
    to Subclause 6.3 of [6, TS 38.214], where $N_{UL\_hop} = 1$ if the higher
    layer parameter frequencyHoppingOffsetLists contains two offset
    values and $N_{UL\_hop} = 2$ if the higher layer parameter
    frequencyHoppingOffsetLists contains four offset values
    $\lceil \log_2(N_{RB}^{UL,BWP}( N_{RB}^{UL,BWP} + 1)/2 ) \rceil$ - $N_{UL\_hop}$ bits provides the
    frequency domain resource allocation according to Subclause
    6.1.2.2.2 of [6, TS 38.214]
  For non-PUSCH hopping with resource allocation type 1:
    $\lceil \log_2(N_{RB}^{UL,BWP}( N_{RB}^{UL,BWP} + 1)/2 ) \rceil$ bits provides
    the frequency domain resource allocation according
    to Subclause 6.1.2.2.2 of [6, TS 38.214]
Time domain resource assignment-4 bits as defined in
Subclause 6.1.2.1 of [6, TS 38.214]
Frequency hopping flag-1 bit according to Table 7.3.1.1.1-3,
as defined in Subclause 6.3 of [6, TS 38.214]
Modulation and coding scheme-5 bits as defined in
Subclause 6.1.4.1 of [6, TS 38.214]
New data indicator-1 bit
Redundancy version-2 bits as defined in Table 7.3.1.1.1-2
HARQ process number-4 bits
TPC command for scheduled PUSCH-2 bits as defined in
Subclause 7.1.1 of [5, TS 38.213]
Padding bits, if required.
UL/SUL indicator-1 bit for UEs configured
with supplementatyUplink in
ServingCellConfig in the cell as defined in
Table 7.3.1.1.1-1 and the TABLE 4-continued number of bits for DCI format 1_0 before padding
is larger than the number
of bits for DCI format 0_0 before padding;
0 bit otherwise. The UL/SUL
indicator, if present, locates in the last bit position
of DCI format 0_0, after the padding bit (s).
If the UL/SUL indicator is present in DCI format
0_0 and the higher
layer parameter pusch-Config is not configured on
both UL and SUL the
UE ignores the UL/SUL indicator field in DCI
format 0_0, and the
corresponding PUSCH scheduled by the DCI
format 0_0 is for the UL
or SUL for which high layer parameter pucch-
Config is configured;
  If the UL/SUL indicator is not present in DCI
  format 0_0 and pucch-
  Config is configured, the corresponding PUSCH
  scheduled by the DCI
  format 0_0 is for the UL or SUL for which high
  layer parameter pucch-Config is configured.
If the UL/SUL indicator is not present in DO
format 0_0 and pucch-Config
is not configured, the corresponding PUSCH
scheduled by the DCI format
0_0 is for the uplink on which the latest PRACH is transmitted.

DCI format 0_1 may be used for non-fallback DCI scheduling a PUSCH, and in this case, a CRC may be scrambled by a C-RNTI. DCI format 0_1 having a CRC scrambled by a C-RNTI may include, for example, the information shown in Table 5, below.

TABLE 5

Identifier for DCI formats-1 bit
  The value of this bit field is always set to 0,
  indicating an UL DCI format
Carrier indicator-0 or 3 hits, as defined in Subclause
10.1 of [5, TS38.213].
UL/SUL indicator-0 bit for UEs not configured with
supplementaryUplink in ServingCellConfig in the cell
or UEs configured with supplementaryUplink in
ServingCellConfig in the cell but only PUCCH carrier
in the cell is configured for PUSCH transmission;
otherwise, 1 bit as defined in Table 7.3.1.1.1-1.
Bandwidth part indicator-0, 1 or 2 bits as determined
by the number of UL BWPs $n_{BWP,RRC}$ configured by
higher layers, excluding the initial UL bandwidth part.
The bitwidth for this field is determined as
$\lceil \log_2(n_{BWP}) \rceil$ bits, where
  $n_{BWP} = n_{BWP,RRC}$ +1 if $n_{BWP,RRC} \leq 3$, in which
  case the bandwidth part indicator is equivalent
  to the ascending order of the higher layer
  pararneter BWP-Id;
  otherwise $n_{BWP} = n_{BWP,RRC}$, in which case
  the bandwidth part indicator
  is defined in Table 7.3.1.1.2-1;
If a UE does not support active BWP change via DCI,
  the UE ignores this bit field.
Frequency domain resource assignment-number
of bits determined by the following, where $N_{RB}^{UL,BWP}$
is the size of the active UL bandwidth part:
  $N_{RBG}$ bits if only resource allocation type 0
  is configured, where $N_{RBG}$ is defined in
    Subclause 6.1.2.2.1 of [6, TS 38.214],
  $\lceil \log_2(N_{RB}^{UL,BWP}( N_{RB}^{UL,BWP} + 1)/2 ) \rceil$ bits if
  only resource allocation type
  1 is configured, or max ($\lceil \log_2(N_{RB}^{UL,BWP}( N_{RB}^{UL,BWP} + 1)/2 ) \rceil$,
  $N_{RBG}$) + 1 bits if both resource allocation type 0 and 1 are
  configured.
  If both resource allocation type 0 and 1 are configured,
  the MSB bit is used to indicate resource allocation
    type 0 or resource allocation type 1, where the bit
  value of 0 indicates resource allocation type 0 and the bit
  value of 1 indicates resource allocation type 1.

TABLE 5-continued

For resource allocation type 0, the $N_{RBG}$ LSBs provide the resource allocation as defined in Subclause 6.1.2.2.1 of [6, TS 38.214].
For resource allocation type 1, the
$\lceil \log_2(N_{RB}^{UL,BWP}(N_{RB}^{UL,BWP}+1)/2) \rceil$
LSBs provide the resource allocation as follows:
  For PUSCH hopping with resource allocation type 1:
    $N_{UL\_hop}$ MSB bits are used to indicate the frequency offset according to Subclause 6.3 of [6, TS 38.214], $N_{UL\_hop} = 1$ if the higher layer parameter fequencyfloppingOffsetLists contains two offset values and $N_{UL\_hop} = 2$ if the higher layer parameter frequencyHoppingOffsetLists contains four offset values
    $\lceil \log_2(N_{RB}^{UL,BWP}(N_{RB}^{UL,BWP}+1)/2) \rceil - N_{UL\_hop}$ bits provides the frequency domain resource allocation according to Subclause 6.1.2.2.2 of [6, TS 38.214]
  For non-PUSCH hopping with resource allocation type 1:
    $\lceil \log_2(N_{RB}^{UL,BWP}(N_{RB}^{UL,BWP}+1)/2) \rceil$ bits provides the frequency domain resource allocation according to Subclause 6.1.2.2.2 of [6, TS 38.214]
If "Bandwidth part indicator" field indicates a bandwidth part other than the active bandwidth part and if both resource allocation type 0 and 1 are configured for the indicated bandwidth part, the UE assumes resource allocation type 0 for the indicated bandwidth part if the bitwidth of the "Frequency domain resource assignment" field of the active bandwidth part is smaller than the bitwidth of the "Frequency domain resource assignment" field of the indicated bandwidth part.
Time domain resource assignment-0, 1, 2, 3, or 4 bits as defined in Subclause 6.1.2.1 of [6, TS38.214]. The bitwidth for this feild is determined as $\lceil \log_2(1) \rceil$ bits, where is the number of entries in the higher layer parameter pusch-TimeDomainAllocationList if the higher layer parameter is configured; otherwise 1 is the number of entries in the default table.
Frequency hopping flag-0 or 1 bit:
  0 bit if only resource allocation type 0 is configured or if the higher layer parameterfrequencyHopping is not configured;
  1 bit according to Table 7.3.1,1.1-3 otherwise, only applicable to resource allocation type 1, as defined in Subclause 6.3 of [6, TS 38.214].
Modulation and coding scheme-5 bits as defined in Subclause 6.1.4,1 of [6, TS 38.214]
New data indicator-1 bit
Redundancy version-2 bits as defined in Table 7.3.1.1.1-2
HARQ process number-4 bits
$1^{st}$ downlink assignment index-1 or 2 bits:
  1 bit for semi-static HARQ-ACK codebook
  2 bits for dynamic HARQ-ACK codebook,
$2^{nd}$ downlink assignment index-0 or 2 bits:
  2 bits for dynamic HARQ-ACK codebook with two HARQ-ACK sub-codebooks
  0 bit otherwise.
TPC command for scheduled PUSCH-2 bits as defined in Subdause 7.1.1 of [5, TS38.213]
SRS resource indicator - $\lceil \log_2((\Sigma_{k=1}^{min\{LSRS_{max}\{\}\}}\Sigma(N_k^{SRS})())) \rceil$ or $\lceil \log_2(N_{SRS}) \rceil$ bits, where $N_{SRS}$ is the number of configured SRS resources in the SRS resource set associated with the higher layer parameter usage of value 'codeBook' or 'nonCodeBook',
  $\lceil \log_2(\Sigma_{k=1}^{min\{LSRS_{max}\{\}\}}\Sigma(N_k^{SRS})()) \rceil$ bits according to Tables 7.3.1.1.2-28/29/30/31 if the higher layer parameter txConfig = nonCodebook, where $N_{SRS}$ is the number of configured SRS resources in the SRS resource set associated with the higher layer parameter usage of value 'nonCodeBook' and
    if UE supports operation with maxMIMO-Layers and the higher layer parameter maxMIMO-Layerss of PUSCH-ServingCellConfig of the serving cell is configured, $L_{max}$ is given by that parameter otherwise, $L_{max}$ is given by the maximum number of layers forPUSCH supported by the UE for the serving cell for non-codebook based operation.
  $\lceil \log_2(N_{SRS}) \rceil$ bits according to Tables 7.3.1.1.2-32 if the higher layer parameter txConfig = codebook, where $N_{SRS}$ is the number of configured SRS resources in the SRS resource set associated with the higher layer parameter usage of value 'codeBook'.
Precoding information and number of layers-number of bits determined by the following:
  0 bits if the higher layer parameter txConfig = nonCodeBook;
  0 bits for 1 antenna port and if the higher layer parameter txConfig = codebook;
  4, 5, or 6 bits according to Table 7.3.1.1.2-2 for 4 antenna ports, if txConfig = codebook, and according to whether transform precoder is enabled or disabled, and the values of higher layer parameters maxRank and codebookSubset;
  2, 4, or 5 bits according to Table 7.3.1.1.2-3 for 4 antenna ports, if txConfig = codebook, and according to whether transform precoder is enabled or disabled, and the values of higher layer parameters maxRank, and code bookSubset;
  2 or 4 bits according to Table7.3.1 .1.2-4 for 2 antenna ports, if txConfig = codebook, and according to whether transform precoder is enabled or disabled, and the values of higher layer parameters maxRank and codebookSubset;
  1 or 3 bits according to Table7.3.1.1.2-5 for 2 antenna ports, if txConfig = codebook, and according to whether transform precoder is enabled or disabled, and the values of higher layer parameters maxRank and codebookSubset.
Antenna ports - number of bits determined by the following
  2 bits as defined by Tables 7.3.1.1.2-6, if transform precoder is enabled, dmrs-Type=1, and maxLength=1;
  4 bits as defined by Tables 7.3.1.1.2-7, if transform precoder is enabled, dmrs-Type=1, and maxLength=2;
  3 bits as defined by Tables 7.3.1.1.2-8/9/10/11, if transform precoder is disabled, dmrs-Type=1, and maxLength=1, and the value of rank is determined according to the SRS resource indicator field if the higher layer parameter txConfig = nonCodebook and according to the Precoding information and number of layers field if the higher layer parameter tx.Config = codebook;
  4 bits as defined by Tables 7.311.2-12/13/14/15, if transform precoder is disabled, dmrs-Type=1, and maxLength=2, and the value of rank is determined according to the SRS resource indicator field if the higher layer parameter txConfig = nonCodebook and according to the Precoding information and number of layers field if the higher layer parameter txConfig = codebook;
  4 bits as defined by Tables 7.3,112-16/17/18/19, if transform precoder is disabled, dmrs-Type=2, and maxLength=1, and the value of rank is determined according to the SRS resource indicator field if the higher layer parameter txConfig = nonCode book and according to the Precoding information and number of layers field if the higher layer parameter txConfig = codebook.
  5 bits as defined by Tables 7.3,1.1.2-20/21/22/23, if transform precoder is disabled, dmrs-Type=2, and maxLengin=2, and the value of rank is determined according to the SRS resource indicator field if the higher layer parameter tx-Contig = nonCodebook and according to the Precoding information and number of layers field if the higher layer parameter txConfig = codebook.
where the number of CDM groups without data of values 1, 2, and 3 in Tables 7.3.1.1.2-6 to 7.3.1.1.2-23 refers to CDM groups {0}, {0,1}, and {0, 1,2} respectively.
If a UE is configured with both dmrs-UplinkForPUSCH-MappingTypeA and dmrs-UplinkForPUSCH-MappingTypeB, the bitwidth of this field equals max$\{x_A, x_B\}$, where $x_A$ is the "Antenna ports" bitwidth derived according to dmrs-UplinkForPUSCH-MappingTypeA and $x_B$ is the "Antenna ports" bitwidth derived according to dmrs-UplinkForPUSCH-MappingTypeB. A number of $|x_A - x_B|$ zeros are padded in the MSB of this field, if the mapping type of the PUSCH corresponds to the smaller value of $x_A$ and $x_B$.
SRS request - 2 bits as defined by Table 7.3.1 .1.2-24 for UEs not configured with supplementaryUplink in ServingCellConfig in the cell; 3 bits for UEs configured with supplementatyUplink in ServingCellConfig in the cell where the first bit is the non-SUL/SUL indicator as defined in Table 7.3.1.1.1-1 and the second and third bits are defined by Table 7.3.1.1.2-24.
This bit field may also indicate the associated CSI-RS according to Subclause 6.1.1.2 of [6, TS 38.214].

TABLE 5-continued

CSI request - 0, 1, 2, 3, 4, 5, or 6 bits determined by
higher layer parameter reportTriggerSize.
CBG transmission information (CBGTI) - 0 bit if
higher layer parameter codeBlockGroupTransmission
for PDSCH is not configured, otherwise, 2,
4, 6, or 8 bits determined by higher layer parameter
maxCodeBlockGroupsPerTransportBlock for PUSCH.
PTRS-DMRS association - number of bits determined as follows
  0 bit if PTRS-UplinkConfig is not configured
  and transform precoder is
  disabled, or if transform precoder is enabled,
  or if maxRank=1;
  2 bits otherwise, where Table 7.3.1.1.2-25
  and 7.3.1.1.2-26 are used to
  indicate the association between PTRS
  port(s) and DMRS port(s) for
  transmission of one PT-RS port and
  two PT-RS ports respectively, and
  the DMRS ports are indicated by the Antenna ports field.
If "Bandwidth part indicator" field indicates a bandwidth
part other than the active bandwidth part and the "PTRS-DMRS
association" field is present for the indicated bandwidth part
but not present for the active bandwidth part, the UE
assumes the "PTRS-DMRS association" field is
not present for the indicated bandwidth part.
beta_offset indicator - 0 if the higher layer parameter
betaOffsets = semiStatic otherwise 2 bits as defined by Table
9.3-3 in [5, TS 38.213]. DMRS sequence initialization - 0
bit if transform precoder is enabled; 1 bit if transform
precoder is disabled.
UL-SCH indicator - 1 bit. A value of "1" indicates UL-SCH
shall be transmitted on the PUSCH and a value of "0" indicates
UL-SCH shall not be transmitted on the PUSCH. Except for DCI
format 0_1 with CRC scrambled by SP-CSI-RNTI, a UE is not
expected to receive a DCI format 0_1 with UL-SCH
indicator of "0" and CSI request of all zero(s).

DCI format 1_0 may be used for fallback DCI scheduling a PDSCH, and in this case, a CRC may be scrambled by a C-RNTI. DCI format 1_0 having a CRC scrambled by a C-RNTI may include, for example, the information shown in Table 6, below.

TABLE 6

Identifier for DCI formats - 1 bits
  The value of this bit field is always set to 1, indicating a DL DCI
  format
Frequency domain resource assignment - $\lceil \log 2(N_{RB}^{DL,BWP}(N_{RB}^{DL,BWP}$
1)/2)] bits where $N_{RB}^{DL,BWP}$ is given by subclause 7.3.1.0
If the CRC of the DCI format 1_0 is scrambled by C-RNTI and the
"Frequency domain resource assignment" field are of all ones, the DCI
format 1_0 is for random access procedure initiated by a PDCCH order,
with all remaining fields set as follows:
  Random Access Preamble index - 6 bits according to ra-PreambleIndex
  in Subclause 5.1.2 of [8, TS38.321]
  UL/SUL indicator - 1 bit. If the value of the "Random Access Preamble
  index" is not all zeros and if the UE is configured with
  supplementaryUplink in ServingCellConfig in the cell, this field
  indicates which UL carrier in the cell to transmit the PRACH according
  to Table 7.3.1.1.1-1; otherwise, this field is reserved
  SS/PBCH index - 6 bits. If the value of the "Random Access Preamble
  index" is not all zeros, this field indicates the SS/PBCH that shall be
  used to determine the RACH occasion for the PRACH transmission;
  otherwise, this field is reserved.
  PRACH Mask index - 4 bits. If the value of the "Random Access
  Preamble index" is not all zeros, this field indicates the RACH occasion
  associated with the SS/PBCH indicated by "SS/PBCH index" for the
  PRACH transmission, according to Subclause 5.1.1 of [8, TS38.321];
  otherwise, this field is reserved
  Reserved bits - 10 bits
Otherwise, all remaining fields are set as follows:
  Time domain resource assignment - 4 bits as defined in Subclause
  5.1.2.1 of [6, TS 38.214]
  VRB-to-PRB mapping - 1 bit according to Table 7.3.1.2.2-5
  Modulation and coding scheme - 5 bits as defined in Subclause 5.1.3
  of [6, TS 38.214]

TABLE 6-continued

New data indicator - 1 bit
Redundancy version - 2 bits as defined in Table 7.3.1.1.1-2
HARQ process number - 4 bits
Downlink assignment index - 2 bits as defined in Subclause 9.1.3 of
[5, TS 38.213], as counter DAI
TPC command for scheduled PUCCH - 2 bits as defined in Subclause
7.2.1 of [5, TS 38.213]
PUCCH resource indicator - 3 bits as defined in Subclause 9.2.3 of
[5, TS 38.213]
PDSC/H-to-HARQ_feedback timing indicator - 3 bits as defined in
Subclause 9.2.3 of [5, TS38.213]

DCI format 1_1 may be used for non-fallback DCI scheduling a PDSCH, and in this case, a CRC may be scrambled by a C-RNTI. DCI format 1_1 having a CRC scrambled by a C-RNTI may include, for example, the information shown in Table 7, below.

TABLE 7

Identifier for DCI formats - 1 bits
  The value of this bit field is always set to 1, indicating a DL DCI
  format
Carrier indicator - 0 or 3 bits as defined in Subclause 10.1 of [5, TS
38.213]
Bandwidth part indicator - 0, 1 or 2 bits as determined by the number
of
  DL BWPs $n_{BWP,RRC}$ configured by higher layers, excluding the initial
  DL bandwidth part. The bitwidth for this field is determined as
  $\lceil \log_2(n_{BWP}) \rceil$ bits, where
    $n_{BWP} = n_{BWP,RRC} + 1$ if $n_{BWP,RRC} \leq 3$, in which case the bandwidth
    part indicator is equivalent to the ascending order of the higher layer
    parameter BWP-Id;
    otherwise $n_{BWP} = n_{BWP,RRC}$, in which case the bandwidth part
    indicator is defined in Table 7.3.1.1.2-1;
  If a UE does not support active BWP change via DCI, the UE ignores
  this bit field.
Frequency domain resource assignment - number of bits determined by
the following, where $N_{RB}^{DL,BWP}$ is the size of the active DL bandwidth
part:
  $N_{RBG}$ bits if only resource allocation type 0 is configured, where $N_{RBG}$
  is defined in Subclause 5.1.2.2.1 of [6, TS38.214],
  $\lceil \log_2 (N_{RB}^{DL,BWP} (N_{RB}^{DL,BWP} + 1)/2) \rceil$ bits if only resource allocation
  type 1 is configured, or
  max ($\lceil \log_2(N_{RB}^{DL,BWP} (N_{RB}^{DL,BWP} + 1)/2) \rceil$, $N_{RBG}$) + 1 bits if both
  resource allocation type 0 and 1 are configured.
  If both resource allocation type 0 and 1 are configured, the MSB bit is
  used to indicate resource allocation type 0 or resource allocation type 1,
  where the bit value of 0 indicates resource allocation type 0 and the bit
  value of 1 indicates resource allocation type 1.
  For resource allocation type 0, the $N_{RBG}$ LSBs provide the resource
  allocation as defined in Subclause 5.1.2.2.1 of [6, TS 38.214].
  For resource allocation type 1, the $\lceil \log_2(N_{RB}^{DL,BWP} (N_{RB}^{DL,BWP} + 1)/2) \rceil$
  LSBs provide the resource allocation as defined in Subclause 5.1.2.2.2
  of [6, TS 38.214]
If "Bandwidth part indicator" field indicates a bandwidth part other than
the active bandwidth part and if both resource allocation type 0 and 1 are
configured for the indicated bandwidth part, the UE assumes resource
allocation type 0 for the indicated bandwidth part if the bitwidth of the
"Frequency domain resource assignment" field of the active bandwidth
part
is smaller than the bitwidth of the "Frequency domain resource
assignment" field of the indicated bandwidth part.
Time domain resource assignment - 0, 1, 2, 3, or 4 bits as defined in
Subclause 5.1.2.1 of [6, TS 38.214]. The bitwidth for this field is
determined as $\lceil \log_2(I) \rceil$ bits, where I is the number of entries in the
higher layer parameter pdsch-TimeDomainAllocationList if the higher
layer parameter is configured; otherwise I is the number of entries in the
default table.
  VRB-to-PRB mapping - 0 or 1 bit:
    0 bit if only resource allocation type 0 is configured or if
    interleaved VRB-to-PRB mapping is not configured by high
    layers;
    1 bit according to Table 7.3.1.2.2-5 otherwise, only applicable to
    resource allocation type 1, as defined in Subclause 7.3.1.6 of
    [4, TS 38.211].

TABLE 7-continued

PRB bundling size indicator - 0 bit if the higher layer parameter prb-BundlingType is not configured or is set to 'static', or 1 bit if the higher layer parameter prb-BundlingType is set to 'dynamic' according to Subclause 5.1.2.3 of [6, TS 38.214].
Rate matching indicator - 0, 1, or 2 bits according to higher layer parameters rateMatchPatternGroup1 and rateMatchPatternGroup2, where the MSB is used to indicate rateMatchPatternGroup1 and the LSB is used to indicate rateMatchPatternGroup2 when there are two groups.
ZP CSI-RS trigger - 0, 1, or 2 bits as defined in Subclause 5.1.4.2 of [6, TS 38.214]. The bitwidth for this field is determined as $\lfloor \log_2(n_{ZP} + 1) \rfloor$ bits, where $n_{ZP}$ is the number of aperiodic ZP CSI-RS resource sets configured by higher layer.
For transport block 1:
    Modulation and coding scheme - 5 bits as defined in Subclause 5.1.3.1 of [6, TS 38.214]
    New data indicator - 1 bit
    Redundancy version - 2 bits as defined in Table 7.3.1.1.1-2
For transport block 2 (only present if maxNrofCodeWordsScheduledByDCI equals 2):
    Modulation and coding scheme - 5 bits as defined in Subclause 5.1.3.1 of [6, TS 38.214]
    New data indicator - 1 bit
    Redundancy version - 2 bits as defined in Table 7.3.1.1.1-2
If "Bandwidth part indicator" field indicates a bandwidth part other than the active bandwidth part and the value of maxNrofCodeWordsScheduledByDCI for the indicated bandwidth part equals 2 and the value of maxNrofCodeWordsScheduledByDCI for the active bandwidth part equals 1, the UE assumes zeros are padded when interpreting the "Modulation and coding scheme", "New data indicator", and "Redundancy version" fields of transport block 2 according to Subclause 12 of [5, TS38.213], and the UE ignores the "Modulation and coding scheme", "New data indicator", and "Redundancy version" fields of transport block 2 for the indicated bandwidth part.
HARQ process number - 4 bits
Downlink assignment index - number of bits as defined in the following
    4 bits if more than one serving cell are configured in the DL and the higher layer parameter pdsch-HARQ-ACK-Codebook=dynamic, where the 2 MSB bits are the counter DAI and the 2 LSB bits are the total DAI;
    2 bits if only one serving cell is configured in the DL and the higher layer parameter pdsch-HARQ-ACK-Codebook=dynamic, where the 2 bits are the counter DAI;
    0 bits otherwise.
TPC command for scheduled PUCCH - 2 bits as defined in Subclause 7.2.1 of [5, TS 38.213]
PUCCH resource indicator - 3 bits as defined in Subclause 9.2.3 of [5, TS 38.213]
PDSCH-to-HARQ_feedback timing indicator - 0, 1, 2, or 3 bits as defined in Subclause 9.2.3 of [5, TS 38.213]. The bitwidth for this field is determined as $\lceil \log_2(I) \rceil$ bits, where I is the number of entries in the higher layer parameter dl-DataToUL-ACK.
Antenna port(s) - 4, 5, or 6 bits as defined by Tables 7.3.1.2.2-1/2/3/4, where the number of CDM groups without data of values 1 2, and 3 refers to CDM groups {0}, {0,1}, and {0, 1,2} respectively. The antenna ports $\{p_0,...,p_{v-1}\}$ shall be determined according to the ordering of DMRS port(s) given by Tables 7.3.1.2.2-1/2/3/4. If a UE is configured with both dmrs-DownlinkForPDSCH-MappingTypeA and dmrs-DownlinkForPDSCH-MappingTypeB, the bitwidth of this field equals max$\{x_A, x_B\}$, where $x_A$ is the "Antenna ports" bitwidth derived according to dmrs-DownlinkForPDSCH-MappingTypeA and $x_B$ is the "Antenna ports" bitwidth derived according to dmrs-DownlinkForPDSCH-MappingTypeB. A number of $|x_A - x_B|$ zeros are padded in the MSB of this field., if the mapping type of the PDSCH corresponds to the smaller value of $x_A$ and $x_B$.
Transmission configuration indication - 0 bit if higher layer parameter tci-PresentInDCI is not enabled; otherwise 3 bits as defined in Subclause 5.1.5 of [6, TS38.214].
If "Bandwidth part indicator" field indicates a bandwidth part other than the active bandwidth part,
    if the higher layer parameter tci-PresentInDCI is not enabled for the CORESET used for the PDCCH carrying the DCI format 1_1,
        the UE assumes tci-PresentInDCI is not enabled for all CORESETs in the indicated bandwidth part;
    otherwise,
        the UE assumes tci-PresentInDCI is enabled for all CORESETs in the indicated bandwidth part.
SRS request - 2 bits as defined by Table 7.311.2-24 for UEs not configured with supplementaryUplink in ServingCellConfig in the cell; 3 bits for UEs configured with supplementaryUplink in ServingCellConfig in the cell where the first bit is the non-SUL/SUL indicator as defined in Table 7.3.111-1 and the second and third bits are defined by Table 7.3.1.1.2-24. This bit field may also indicate the associated CSI-RS according to Subclause 6.1.1.2 of [6, TS 38.214].
CBG transmission information (CBGTI) - 0 bit if higher layer parameter codeBlockGroupTransmission for PDSCH is not configured, otherwise, 2, 4, 6, or 8 bits as defined in Subclause 5.1.7 of [6, TS38.214], determined by the higher layer parameters maxCodeBlockGroupsPerTransportBlock and maxNrofCodeWordsScheduledByDCI for the PDSCH.
CBG flushing out information (CBGFI) - 1 bit if higher layer parameter codeBlockGroupFlushIndicator is configured as "TRUE", 0 bit otherwise.
DMRS sequence initialization - 1 bit.

Hereinafter, a method for assigning time domain resources for a data channel in a 5G communication system will be described.

A base station may configure, for a terminal, a table relating to time domain resource allocation information for a downlink data channel (a PDSCH) and an uplink data channel (a PUSCH) through higher layer signaling (e.g. RRC signaling). The base station may configure, for a PDSCH, a table configured by a maximum of 16 entries (maxNrofDL-Allocations=16), and may configure, for a PUSCH, a table configured by a maximum of 16 entries (maxNrofUL-Allocations=16). Time domain resource allocation (TD-RA) information may include, for example, PDCCH-to-PDSCH slot timing (a time interval expressed in the units of slots, between a time point at which a PDCCH is received, and a time point at which a PDSCH scheduled by the received PDCCH is transmitted, the timing is indicated by $K_0$) or PDCCH-to-PUSCH slot timing (i.e. a time interval expressed in the units of slots, between a time point at which a PDCCH is received, and a time point at which a PUSCH scheduled by the received PDCCH is transmitted, the timing is indicated by $K_2$), information relating to the location of a starting symbol of a PDSCH or a PUSCH scheduled in a slot, the scheduled length, and a mapping type of a PDSCH or a PUSCH. For example, a terminal may be notified, by a base station, of the information shown in Tables 8 and 9, below.

TABLE 8

PDSCH-TimeDomainResourceAllocationList information element
PDSCH-TimeDomainResourceAllocationList ::= SEQUENCE (SIZE(1..maxNrofDL-Allocations)) OF PDSCH-TimeDomainResourceAllocation
PDSCH-TimeDomainResourceAllocation ::= SEQUENCE {

TABLE 8-continued

```
k0                                     INTEGER(0..32)
OPTIONAL,    ---Need S
  (PDCCH-to-PDSCH timing in units of slots)
mappingType                            ENUMERATED {typeA,
typeB},
  (PDSCH mapping type)
startSymbol AndLength                  INTEGER (0..127)
(Length and starting symbol of PDSCH)
}
```

TABLE 9

```
PUSCH-TimeDomainResourceAllocationList information element
PUSCH-TimeDomainResourceAllocationList ::=  SEQUENCE
(SIZE(1..maxNrofUL-Allocations))            OF           PUSCH-
TimeDomainResourceAllocation
PUSCH-TimeDomainResourceAllocation ::=  SEQUENCE {
  k2                                   INTEGER(0..32)
OPTIONAL,    ---Need S
  (PDCCH-to-PUSCH timing in units of slots)
  mappingType                          ENUMERATED {typeA,
typeB},
  (PUSCH mapping type)
  startSymbol AndLength                INTEGER (0..127)
  (Length and starting symbol of PUSCH)
}
```

The base station may notify the terminal of one of the entries of the table relating to the time domain resource allocation information through L1 signaling (e.g. DCI) (e.g. the base station may indicate one of the entries to the terminal through a time domain resource allocation field in DCI). The terminal may obtain time domain resource allocation information relating to a PDSCH or PUSCH, based on DCI received from the base station.

Hereinafter, a method for assigning frequency domain resources for a data channel in a 5G communication system will be described.

5G supports two types of allocations including resource allocation type 0 and resource allocation type 1, as a method for indicating frequency domain resource allocation information for a downlink data channel (a PDSCH) and an uplink data channel (a PUSCH).

Resource Allocation Type 0

RB allocation information may be notified of from a base station to a terminal in a type of a bitmap for a resource block group (RBG). The RBG may be configured by a set of consecutive VRBs, and the size P of the RBG may be determined on the basis of a value configured as a higher layer parameter (rbg-Size), and the size of a BWP, defined in Table 10 below.

TABLE 10

| | Nominal RBG size P | |
|---|---|---|
| BWP Size | Configuration 1 | Configuration 2 |
| 1-36 | 2 | 4 |
| 37-72 | 4 | 8 |
| 73-144 | 8 | 16 |
| 145-275 | 16 | 16 |

A total number ($N_{RBG}$) of RBGs of BWP i having a size of $N_{BWP,i}^{size}$ may be defined as below.

$N_{RBG}=\lceil(N_{BWP,i}^{size}+(N_{BWP,i}^{start} \bmod P))/P\rceil$, where the size of the first RBG is $RBG_0^{size}=P-N_{BWP,i}^{start} \bmod P$,
the size of last RBG $RBG_0^{size}=P-N_{BWP,i}^{start} \bmod P$, $(N_{BWP,i}^{start}+N_{BWP,i}^{size}) \bmod P>0$ and P otherwise,
the size of all other RBGs is P.

Each hit of a bitmap having a size of $N_{RBG}$ bits may correspond to each RBG. RBGs may be assigned indexes according to a sequence in which the frequency increases from the lowest frequency position of a BWP. With respect to $N_{RBG}$ number of RBGs in a BWP, RBG #0 to RBG #($N_{RBG}-1$) may be mapped from the MSB to the LSB of an RBG bitmap. When a particular bit value in a bitmap is 1, the terminal may determine that an RBG corresponding to the bit value has been assigned, and when a particular bit value in a bitmap is 0, the terminal may determine that an RBG corresponding to the bit value has not been assigned.

Resource Allocation Type 1

RB allocation information may be notified of from a base station to a terminal by information relating to the starting position and length of consecutively assigned VRBs. Interleaving or non-interleaving may be additionally applied to the consecutively assigned VRBs. A resource allocation field of resource allocation type 1 may be configured by a resource indication value (RIV), and the RIV may be configured by the starting point ($RB_{start}$) of a VRB and the length ($L_{RBs}$) of consecutively assigned RBs. More specifically, an RIV of a BWP having a size of $N_{BWP}^{size}$ may be defined as follows.

if $(L_{RBs}-1) \leq \lfloor N_{BWP}^{size}/2 \rfloor$ then $RIV=N_{BWP}^{size}(L_{RBs}-1)+RB_{start}$ else $RIV=N_{BWP}^{size}(N_{BWP}^{size}-L_{RBs}+1)+(N_{BWP}^{size}-1-RB_{start})$ where $L_{RBs} \geq 1$ and shall not exceed $N_{BWP}^{size}-RB_{start}$.

The base station may configure, for the terminal, a resource allocation type through higher layer signaling (e.g. a higher layer parameter resourceAllocation may be configured to be one value among resourceAllocationType0, resourceAllocationType1, or dynamicSwitch). If both resource allocation types 0 and 1 are configured for the terminal (or in the same way, the higher layer parameter resourceAllocation is configured to be dynamicSwitch), a bit corresponding to the MSB in a resource allocation indication field in a DCI format indicating scheduling may indicate resource allocation type 0 or 1, resource allocation information may be indicated through the remaining bits except for the bit corresponding to the MSB on the basis of the indicated resource allocation type, and the terminal may interpret resource allocation field information of the DCI field, based on the indications. If one of resource allocation type 0 or 1 is configured for the terminal (or in the same way, the higher layer parameter resourceAllocation is configured to be resourceAllocationType0 or resourceAllocation Type1), a resource allocation indication field in a DCI format indicating scheduling may indicate resource allocation information, based on the configured resource allocation type, and the terminal may interpret resource allocation field information of the DCI field, based on the indication.

Hereinafter, a downlink control channel of a 5G communication system will be described in detail with reference to the drawings.

Figure 4:
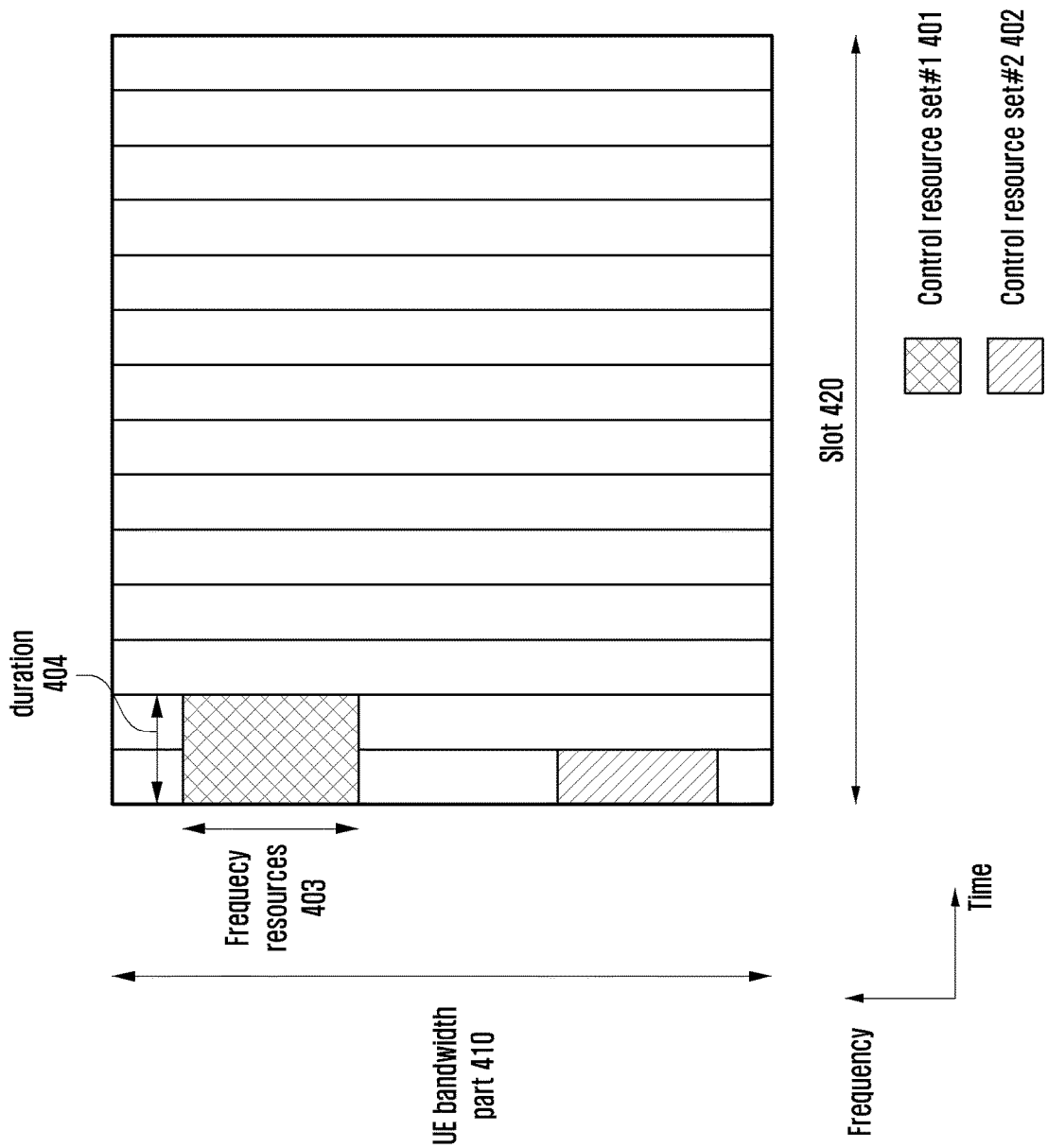
FIG. 4 illustrates an example of a control resource set (CORESET) configuration of a downlink control channel of a 5G system, according to an embodiment.

FIG. 4 illustrates an example of a CORESET on which a downlink control channel is transmitted in a 5G wireless communication system, according to an embodiment. FIG. 4 shows an example in which a UE BWP 410 of a terminal is configured along a frequency axis, and CORESET #1 401 and CORESET #2 402 are configured in one slot 420 along a time axis. The CORESETs 401 and 402 may be configured on a particular frequency resource 403 in the entire terminal BWP 410 along the frequency axis. CORESET #1 401 and CORESET #2 402 may be configured by one OFDM symbol or multiple OFDM symbols along the time axis, and the configured OFDM symbol or symbols may be defined as a CORESET duration 404. With reference to the example illustrated in FIG. 4, CORESET #1 401 is configured to have a CORESET duration of two symbols, and CORESET #2 402 is configured to have a CORESET duration of one symbol.

A CORESET in 5G, described above, may be configured for a terminal by a base station through higher layer signaling (e.g. system information, MIB, and RRC signaling). Configuring a CORESET for a terminal means providing of information such as a CORESET identity, the frequency location of the CORESET, or the symbol length of the CORESET. For example, the configuration may include the information shown in Table 11, below.

TABLE 11

| | |
|---|---|
| ControlResourceSet ::= | SEQUENCE { |
| -- Corresponds to L1 parameter 'CORESET-ID' | |
| controlResourceSetId | ControlResourceSetid, |
| (CORESET identifier (Identity)) | |
| frequencyDomainResources | BIT STRING (SIZE (45)), |
| (Frequency axis resource allocation information) | |
| duration | INTEGER (1.. maxCoReSetDuration), |
| (Time axis resource allocation information) | |
| cce-REG-MappingType | CHOICE { |
| (CCE-to-REG mapping scheme) | |
|    interleaved | SEQUENCE { |
|       reg-BundleSize | ENUMERATED {n2, n3, n6}, |
|       (REG bundle size) | |
|       precoderGranularity | ENUMERATED {sameAsREG-bundle, allContiguousRBs}, |
|       interleaverSize | ENUMERATED {n2, n3, n6} |
|       (Interleaver size) | |
|       shiftIndex | INTEGER(0..maxNrofPhysicalResourceBlocks-1) OPTIONAL |
|       (Interleaver shift) | |
|    }, | |
|    nonInterleaved | NULL |
| }, | |
| tci-StatesPDCCH | SEQUENCE(SIZE (1..maxNrofTCI-StatesPDCCH)) OF TCI-StateId OPTIONAL, |
| (QCL configuration information) | |
| tci-PresentInDCI | ENUMERATED {enabled} OPTIONAL, -- Need S |
| } | |

In Table 11, tci-StatesPDCCH (simply, referred to as a transmission configuration indication (TCI) state) configuration information may include information on the index or indexes of one or multiple SS/PBCH blocks having a quasi-co-located (QCL) relationship with a DMRS transmitted on a corresponding CORESET, or information on the index of a channel state information reference signal (CSI-RS).

Figure 5:
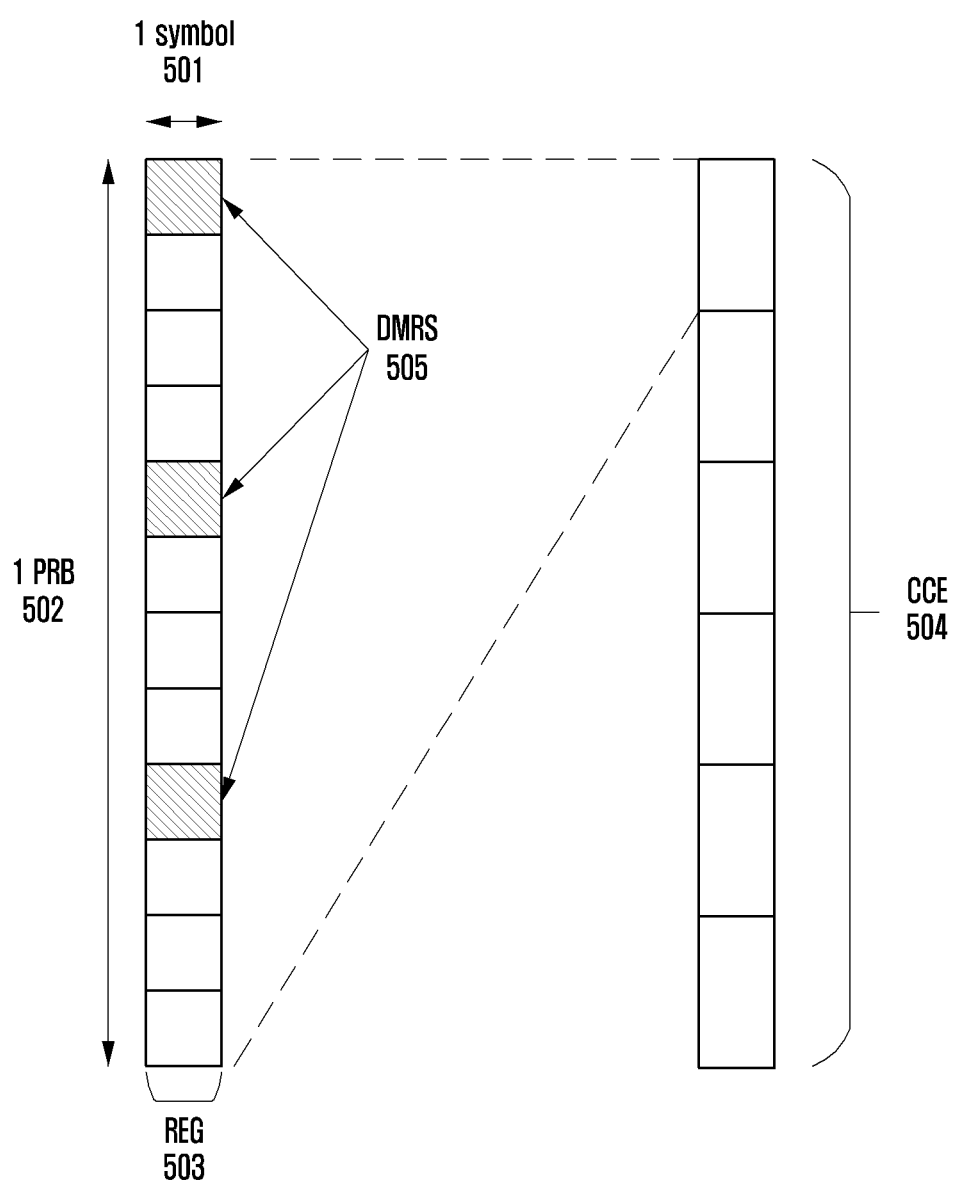
FIG. 5 illustrates a structure of a downlink control channel of a 5G system, according to an embodiment.

FIG. 5 illustrates an example of a basic unit of time and frequency resources configuring a downlink control channel, which can be used in 5G, according to an embodiment. As illustrated in FIG. 5, a basic unit of time and frequency resources configuring a control channel may be named a resource element group (REG) 503, and the REG 503 may be defined as one OFDM symbol 501 in a time axis and one PRB 502 in a frequency axis, that is, may be defined as 12 subcarriers. A base station connects and attaches REGs 503 described above to each other to configure a downlink control channel assignment unit.

As illustrated in FIG. 5, if a basic unit for the assignment of a downlink control channel in 5G is a control channel element (CCE) 504, one CCE 504 may be configured by a plurality of the REGs 503. For example, the REG 503 illustrated in FIG. 5 may be configured by 12 REs, and if one CCE 504 is configured by six REGs 503, the one CCE 504 may be configured by 72 REs. If a downlink CORESET is configured, the resource set may be configured by a plurality of CCEs 504, and a particular downlink control channel may be transmitted after being mapped to one CCE 504 or multiple CCEs 504 according to an aggregation level (AL) in the CORESET. CCEs 504 in a CORESET are distinguished by numbers, and the numbers of the CCEs 504 may be assigned according to a logical mapping scheme.

The basic unit of a downlink control channel, illustrated in FIG. 5, that is, an REG 503 may include REs to which DCI is mapped and a region to which a DMRS 505, which is a reference signal for decoding the REs, is mapped. As illustrated in FIG. 5, three DMRSs 505 may be transmitted in one REG 503. The number of CCEs required for transmitting a PDCCH may be 1, 2, 4, 8, and 16 according to ALs, and different numbers of CCEs may be used to implement the link adaptation of the downlink control channel. For example, if AL=L, one downlink control channel may be transmitted through L number of CCEs. A terminal is required to detect a signal in the state where the terminal does not know information relating to a downlink control channel, and a search space indicating a set of CCEs is defined for blind decoding. A search space is a set of downlink control channel candidates configured by CCEs to which the terminal is required to attempt to decode at a given aggregation level. Since there are various aggregation levels grouping 1, 2, 4, 8, and 16 CCEs into one, respectively, the terminal may have a plurality of search spaces. A search space set may be defined to be a set of search spaces at all the configured aggregation levels.

Search spaces may be classified into a common search space and a terminal (UE)-specific search space. A particular group of terminals or all terminals may investigate a common search space for a PDCCH to receive cell-common control information such as a paging message or dynamic scheduling for system information. The terminals may investigate a common search space for a PDCCH to receive PDSCH scheduling assignment information for transmission of a SIB including cell operator information. In the case of a common search space, a particular group of terminals or all terminals are required to receive a PDCCH, and thus the common search space may be defined to be a pre-promised set of CCEs. The terminals may investigate a terminal-specific search space for a PDCCH to receive scheduling assignment information for a terminal-specific PDSCH or PUSCH. A terminal-specific search space may be defined terminal-specifically by using the identity of a terminal and the functions of various system parameters.

In 5G, a parameter for a search space for a PDCCH may be configured for a terminal by a base station through higher layer signaling (e.g. SIB, MIB, and RRC signaling). For example, the base station may configure, for the terminal, the number of PDCCH candidates at each aggregation level L, a monitoring period for a search space, a monitoring occasion expressed in the units of symbols in a slot of a search space, a search space type (common search space or terminal-specific search space), a combination of an RNTI and a DCI format to be monitored in a corresponding search space, and the index of a CORESET in which a search space is to be monitored. For example, a parameter relating to a search space for a PDCCH may include the information shown in Table 12, below.

TABLE 12

```
SearchSpace ::=                          SEQUENCE {
    Identity of the search space. SearchSpaceId = 0 identifies the SearchSpace
    configured via PBCH (MIB) or ServingCellConfigCommon.
    searchSpaceId                        SearchSpaceId,
    (Search space identifier)
    controlResourceSetId                 ControlResourceSetId,
    (CORESET identifier)
    monitoringSlotPeriodicityAndOffset   CHOICE {
    (Monitoring slot level period)
        sl1                              NULL,
        sl2                              INTEGER (0..1),
        sl4                              INTEGER (0..3),
        sl5                              INTEGER (0..4),
        sl8                              INTEGER (0..7),
        sl10                             INTEGER (0..9),
        sl16                             INTEGER (0..15),
        sl20                             INTEGER (0..19)
    }
                                         OPTIONAL,
    duration(Monitoring length)                      INTEGER (2..2559)
    monitoringSymbolsWithinSlot                      BIT STRING (SIZE (14))
                                                     OPTIONAL,
    (Monitoring symbols in slot)
    nrofCandidates                       SEQUENCE {
    (The number of PDCCH candidates for each aggregation level)
        aggregationLevel1                ENUMERATED {n0, n1, n2, n3,
    n4, n5, n6, n8},
        aggregationLevel2                ENUMERATED {n0, n1, n2, n3,
    n4, n5, n6, n8},
        aggregationLevel4                ENUMERATED {n0, n1, n2, n3,
    n4, n5, n6, n8},
        aggregationLevel8                ENUMERATED {n0, n1, n2, n3,
    n4, n5, n6, n8},
        aggregationLevel16               ENUMERATED {n0, n1, n2, n3,
    n4, n5, n6, n8}
    }
```

TABLE 12-continued

```
searchSpaceType                            CHOICE {
(Search space type)
     Configures this search space as common search space (CSS) and DCI
formats to monitor.
     common                                SEQUENCE {
  (Common search space)
     }
     ue-Specific                           SEQUENCE {
  (Terminal-specific search space)
       Indicates whether the UE monitors in this USS for DCI formats 0-0
and 1-0 or for formats 0-1 and 1-1.
        formats                            ENUMERATED {formats0-
0-And-1-0, formats0-1-And-1-1},
        ...
     }
}
```

The base station may configure one search space set or multiple search space sets for the terminal according to the configuration information. The base station may configure search space set 1 and search space set 2 for the terminal. In search space set 1, DCI format A scrambled by X-RNTI may be configured to be monitored in a common search space, and in search space set 2, DCI format B scrambled by Y-RNTI may be configured to be monitored in a terminal-specific search space.

According to the configuration information, one search space set or multiple search space sets may exist in a common search space or a terminal-specific search space. For example, search space set #1 and search space set #2 may be configured to be common search spaces, and search space set #3 and search space set #4 may be configured to be terminal-specific search spaces.

In a common search space, the following combinations of a DCI format and an RNTI, as shown below, may be monitored.

DCI format 0_0/1_0 with CRC scrambled by C-RNTI, CS-RNTI, SP-CSI-RNTI, RA-RNTI, TC-RNTI, P-RNTI, SI-RNTI DCI format 2_0 with CRC scrambled by SFI-RNTI DCI format 2_1 with CRC scrambled by INT-RNTI DCI format 2_2 with CRC scrambled by TPC-PUSCH-RNTI, TPC-PUCCH-RNTI DCI format 2_3 with CRC scrambled by TPC-SRS-RNTI In a terminal-specific search space, the following combinations of a DCI format and an RNTI, as shown below, may be monitored.

DCI format 0_0/1_0 with CRC scrambled by C-RNTI, CS-RNTI, TC-RNTI

DCI format 1_0/1_1 with CRC scrambled by C-RNTI, CS-RNTI, TC-RNTI

The described types of RNTIs may be characterized by the following definitions and purposes, as shown below.

C-RNTI: for the purpose of scheduling a terminal-specific PDSCH.

Temporary C-RNTI (TC-RNTI): for the purpose of scheduling a terminal-specific PDSCH.

Configured scheduling RNTI (CS-RNTI): for the purpose of scheduling semi-statically configured terminal-specific PDSCH.

Random access RNTI (RA-RNTI): for the purpose of scheduling a PDSCH in a random access stage.

Paging RNTI (P-RNTI): for the purpose of scheduling a PDSCH on which paging is transmitted.

System information RNTI (SI-RNTI): for the purpose of scheduling a PDSCH on which system information is transmitted.

Interruption RNTI (INT-RNTI): for the purpose of notifying of whether a PDSCH is punctured.

TPC for PUSCH RNTI (TPC-PUSCH-RNTI): for the purpose of indicating a power control command for a PUSCH.

TPC for PUCCH RNTI (TPC-PUCCH-RNTI): for the purpose of indicating a power control command for a PUCCH.

TPC for SRS RNTI (TPC-SRS-RNTI): for the purpose of indicating a power control command for an SRS.

The described DCI formats may be characterized by the following usages shown in Table 13, below.

TABLE 13

| DCI format | Usage |
| --- | --- |
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

In 5G, a search space for aggregation level L in CORESET p and search space set s may be expressed as shown in Equation (1), below.

$$L \cdot \left\{ \left( Y_{p,n_{s,f}^{\mu}} + \left\lfloor \frac{m_{s,n_{CI}} \cdot n_{CCE,p}}{L \cdot M_{p,s,max}^{(L)}} \right\rfloor + n_{CI} \right) \bmod \lfloor N_{CCE,p} / L \rfloor \right\} + i \quad (1)$$

The variables shown above in Equation (1) are defined as follows:

L: aggregation level $n_{CI}$: carrier index $N_{CCE,p}$: the total number of CCEs existing in CORESET p $n_{s,f}^{\mu}$: slot index $M_{p,s,max}^{(L)}$: the number of PDCCH candidates at aggregation level L $m_{s,n_{CI}}=0, \ldots, M_{p,s,max}^{(L)}-1$: the indexes of PDCCH candidates at aggregation level L i=0, ..., L−1

$Y_{p,n_{s,f}^\mu} = (A_p \cdot Y_{p,n_{s,f}^\mu-1}) \mod D$, $Y_{p,-1} = n_{RNTI} \neq 0$, $A_0 = 39827$, $A_1 = 39829$, $A_2 = 39839$, $D = 65537$ $n_{RNTI}$: terminal identifier In a case of a common search space, $Y\_(p, n^\mu_{s,f})$ may be 0.

In a case of a terminal-specific search space, $Y\_(p, n^\mu_{s,f})$ may be changed according to a time index and the identity (C-RNTI or ID configured for a terminal by a base station) of a terminal.

In 5G, a plurality of search space sets may be configured by different parameters (e.g. the parameters in Table 10). Therefore, a set of search space sets monitored by a terminal may be changed at every time point. For example, if search space set #1 is configured to have an X-slot period, search space set #2 is configured to have an Y-slot period, and X is different from Y, a terminal may monitor both search space set #1 and search space set #2 in a particular slot, and may monitor one of search space set #1 and search space set #2 in a particular slot.

If a plurality of search space sets are configured for a terminal, the conditions below may be considered in a method for determining a search space set required to be monitored by the terminal.

Condition 1: Limitation of the Maximum Number of PDCCH Candidates

The number of PDCCH candidates that can be monitored per slot does not exceed $M^\mu$. $M^\mu$ may be defined to be the maximum number of PDCCH candidates per slot in a cell configured to have subcarrier spacing of $15 \cdot 2^\mu$ KHz, and may be defined as shown in Table 14, below.

TABLE 14

| μ | Maximum number of PDCCH candidates per slot and per serving cell ($M^\mu$) |
|---|---|
| 0 | 44 |
| 1 | 36 |
| 2 | 22 |
| 3 | 20 |

Condition 2: Limitation of the Maximum Number of CCEs

The number of CCEs configuring an entire search space (herein, the entire search space denotes all CCE sets corresponding to a union region of a plurality of search space sets) per slot does not exceed $C^\mu$. $C^\mu$ may be defined to be the maximum number of CCEs per slot in a cell configured to have subcarrier spacing of $15 \cdot 2^\mu$ kHz, and may be defined as shown in Table 15, below.

TABLE 15

| μ | Maximum number of CCEs per slot and per serving cell ($C^\mu$) |
|---|---|
| 0 | 56 |
| 1 | 56 |
| 2 | 48 |
| 3 | 32 |

For convenience of explanation, condition A is defined as a situation satisfying both conditions 1 and 2 at a particular time point. Therefore, non-satisfaction of condition A may imply non-satisfaction of at least one of conditions 1 and 2.

A case which does not satisfy condition A at a particular time point may occur according to a configuration of search space sets by the base station. If condition A is not satisfied at a particular time point, the terminal may select and monitor only a part of search space sets configured to satisfy condition A at the time point, and the base station may transmit a PDCCH through the selected part of search space sets.

A method of selecting some search spaces of all configured search space sets is described below.

In a case where condition A relating to a PDCCH is not satisfied at a particular time point (slot), a terminal (a base station) may select a search space set configured to have a search space type of a common search space among search space sets existing at the time point in preference to a search space set configured to have a search space type of a terminal-specific search space.

If all search space sets configured as a common search space are selected (i.e. if condition A is satisfied even after all search spaces configured as a common search space are selected), the terminal (or the base station) may select search space sets configured as a terminal-specific search space. If there are a plurality of search space sets configured as a terminal-specific search space, the smaller the index of a search space set, the higher the priority of the search space set. Terminal-specific search space sets may be selected within a range of satisfying condition A in consideration of the priorities.

Figure 6:
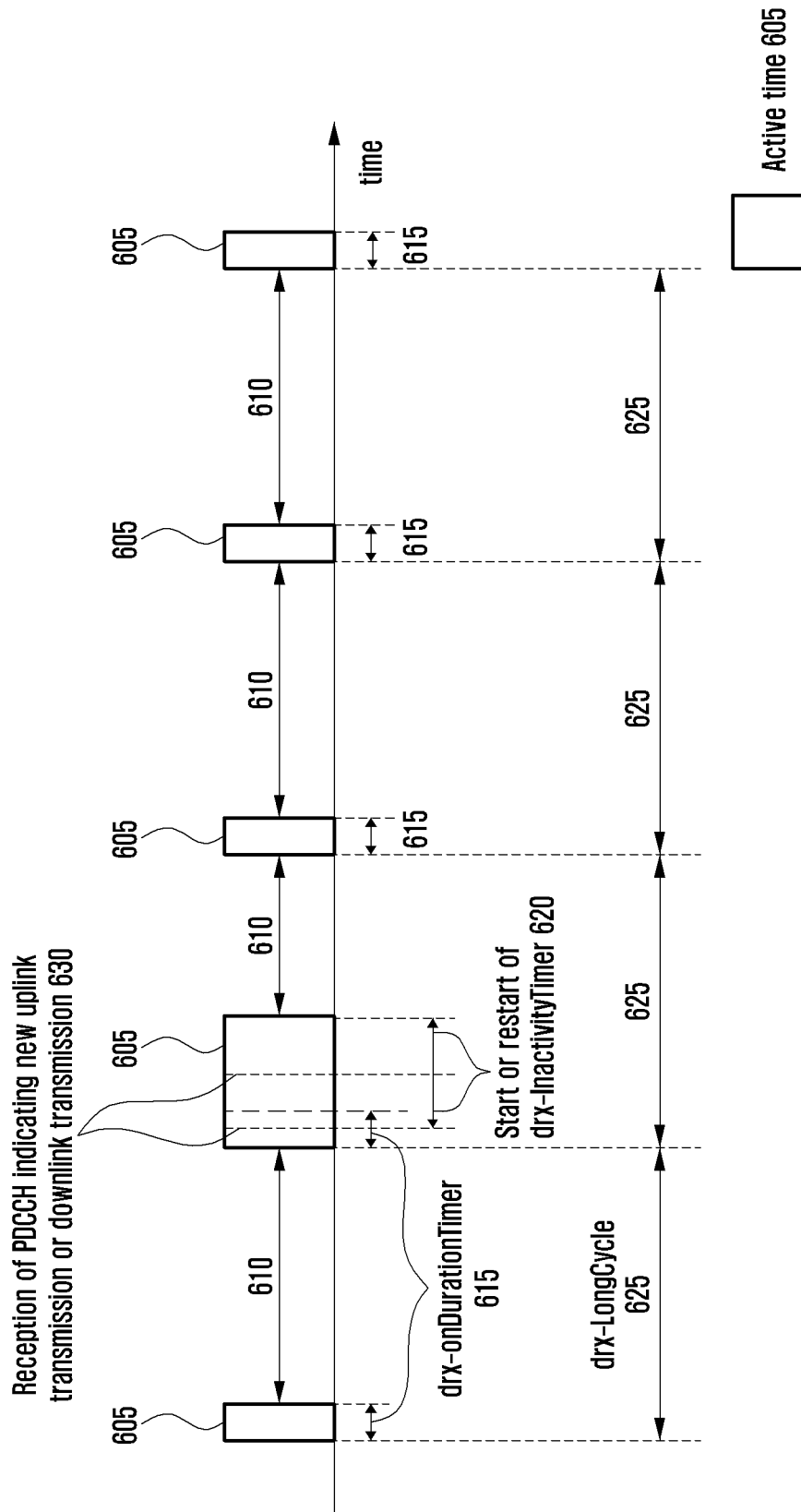
FIG. 6 illustrates an example of a discontinuous reception (DRX) operation of a 5G system, according to an embodiment.

FIG. 6 illustrates discontinuous reception (DRX) according to an embodiment.

Discontinuous reception (DRX) is an operation in which a terminal using a service discontinuously receives data in an RRC-connected state in which a wireless link is configured between a base station and the terminal. In a case where DRX is applied, the terminal may turn on a receiver at a particular time point to monitor a control channel. If there is no data received for a predetermined period, the terminal may turn off the receiver to reduce the power consumption of the terminal. A DRX operation may be controlled by a media access control (MAC) layer device, based on various parameters and timers.

Referring to FIG. 6, an active time 605 is a time interval for which the terminal wakes up at DRX periods and monitors a PDCCH. The active time 605 may be defined based on the following parameters.

drx-onDurationTimer, drx-InactivityTimer, drx-RetransmissionTimerDL, drx-RetransmissionTimerUL or ra-ContentionResolutionTimer is running;

a Scheduling Request is sent on PUCCH and is pending; or a PDCCH indicating a new transmission addressed to the C-RNTI of the MAC entity has not been received after successful reception of a random access response for the random access preamble not selected by the MAC entity among the contention-based random access preamble.

A drx-onDurationTimer, drx-InactivityTimer, drx-RetransmissionTimerDL, drx-RetransmissionTimerUL, and ra-ContentionResolutionTimer are timers, the values of which are configured by the base station, and function to configure the terminal to monitor a PDCCH in a situation satisfying a predetermined condition.

A drx-onDurationTimer 615 is a parameter for configuring a minimum time interval in which the terminal is awake in a DRX cycle. A drx-InactivityTimer 620 is a parameter for configuring a time interval in which the terminal is additionally awake in a case 630 where a PDCCH indicating new uplink transmission or downlink transmission is received. A drx-RetransmissionTimerDL is a parameter for configuring a maximum time interval in which the terminal is awake to receive downlink retransmission in a downlink HARQ process. A drx-RetransmissionTimerUL is a parameter for configuring a maximum time interval in which the terminal is awake to receive a grant for uplink retransmission in an uplink process. A drx-onDurationTimer, drx-Inactivity-Timer, drx-RetransmissionTimerDL, and drx-RetransmissionTimerUL may be configured by a time, the number of subframes, or the number of slots. An ra-ContentionResolutionTimer is a parameter for monitoring a PDCCH in a random access process.

An inactive time 610 is a time interval configured not to monitor or receive a PDCCH in the DRX operation. The time interval remaining after subtracting the active time 605 from the entire time interval in which the DRX operation is performed may be the inactive time 610. If the terminal does not monitor a PDCCH during the active time 605, the terminal may enter a sleep or inactive state to reduce power consumption.

A DRX cycle denotes a period according to which the terminal wakes up and monitors a PDCCH. That is, a DRX cycle denotes a time interval between monitoring of a PDCCH by the terminal and monitoring of a next PDCCH, or an on-duration occurrence period. There are two types of DRX cycles which may be applied, a short DRX cycle and a long DRX cycle.

A long DRX cycle 625 is a long cycle among two types of DRX cycles configured for the terminal. While the terminal is operating according to a long DRX cycle, the terminal restarts the drx-onDurationTimer 615 at a time point after passage of the long DRX cycle 625 from a start point (e.g. starting symbol) of the drx-onDurationTimer 615. If the terminal is operated according to the long DRX cycle 625, the terminal may start the drx-onDurationTimer 615 in a slot after passage of a drx-SlotOffset in a subframe satisfying Equation (2), below. The drx-SlotOffset implies a delay before the drx-onDurationTimer 615 is started. The drx-SlotOffset may be configured by a time, or the number of slots.

$$[(SFN \times 10) + \text{subframe number}] \text{modulo}(\text{drx-LongCycle}) = \text{drx-StartOffset} \quad (2)$$

A drx-LongCycleStartOffset may include the long DRX cycle 625 and a drx-StartOffset, and may be used to define a subframe in which the long DRX cycle 625 is to start. The drx-LongCycleStartOffset may be configured by a time, the number of slots, or the number of slots.

The short DRX cycle is the short cycle among two DRX cycles defined for a terminal. If there occurs a predetermined event, for example, a case where a PDCCH indicating a new uplink transmission or downlink transmission is received 630, in the active time 605 while the terminal is being operated according to the long DRX cycle 625, the terminal may start or restart the drx-InactivityTimer 620. If the drx-InactivityTimer 620 is expired or a DRX command MAC CE is received, the terminal may be operated according to a short DRX cycle.

As illustrated in FIG. 6, the terminal may start a drx-ShortCycleTimer at a time point when the prior drx-onDurationTimer 615 or drx-InactivityTimer 620 is expired, and may be operated according to a short DRX cycle until the drx-ShortCycleTimer is expired. If a PDCCH indicating a new uplink transmission or downlink transmission is received 630, the terminal may extend the active time 605 or delay the arrival of the inactive time 610 while expecting that there will be also additional uplink transmission or downlink transmission. While the terminal is operated according to a short DRX cycle, the terminal restarts the drx-onDurationTimer 615 at a time point after passage of a short DRX cycle from the starting point of a prior on-duration. Thereafter, when the drx-ShortCycleTimer is expired, the terminal again starts to operate according to the long DRX cycle 625.

If the terminal is operated according to a short DRX cycle, the terminal may start the drx-onDurationTimer 615 after passage of a drx-SlotOffset in a subframe satisfying Equation (3), below. The drx-SlotOffset implies a delay before the drx-onDurationTimer 615 is started. The drx-SlotOffset may be configured by a time or the number of slots.

$$[(SFN \times 10) + \text{subframe number}] \text{modulo}(\text{drx-ShortCycle}) = (\text{drx-StartOffset}) \text{modulo}(\text{drx-ShortCycle}) \quad (3)$$

The drx-ShortCycle and the drx-StartOffset may be used to define a subframe in which a short DRX cycle is to start. The drx-ShortCycle and the drx-StartOffset may be configured by a time or the number of slots.

In the above description, a DRX operation has been explained with reference to FIG. 6. According to an embodiment, a terminal can reduce power consumption by performing a DRX operation. However, even if a terminal performs a DRX operation, the terminal does not always receive a PDCCH related to the terminal in the active time 605. Therefore, an embodiment may provide a signal for controlling the operation of a terminal in order to more efficiently save the power of the terminal.

Hereinafter, a carrier aggregation and scheduling method for a 5G communication system will be described.

A terminal may connect to a primary cell through an initial access, and a base station may additionally configure one or multiple secondary cells for the terminal. The terminal may perform communication through serving cells including the primary cell and secondary cells configured by the base station.

The base station may additionally configure whether cross-carrier scheduling is performed for cells configured for the terminal. For convenience of explanation, in a case where cross-carrier scheduling is configured, a cell performing scheduling (i.e. a cell receiving downlink control information corresponding to a downlink assignment or an uplink grant) is collectively referred to as a first cell, and a cell which is scheduled (i.e. a cell on which downlink or uplink data is actually scheduled on the basis of downlink control information, and is then transmitted or received) is named a second cell. If cross-carrier scheduling for particular cell A (a cell which is scheduled, i.e., a scheduled cell) is configured for the terminal by the base station (wherein cell A corresponds to a second cell), the terminal may not perform PDCCH monitoring on cell A and cell B, which is indicated by the cross-carrier scheduling, that is, a scheduling cell (wherein cell B corresponds to a first cell). The base station may configure, for the terminal, information relating to a first cell scheduling for a second cell (e.g. the cell index of a cell corresponding to the first cell), and a carrier indicator field (CIF) value for the second cell in order to configure cross-carrier scheduling for the terminal. For example, the configuration information shown below in Table 16 may be communicated to the terminal from the base station through higher layer signaling (e.g. RRC signaling).

TABLE 16

| | |
|---|---|
| CrossCarrierSchedulingConfig ::= | SEQUENCE { |
| schedulingCellInfo | CHOICE { |
| own (self-carrier scheduling) | SEQUENCE { |
| No cross carrier scheduling | |
| cif-Presence | BOOLEAN |
| }, | |

TABLE 16-continued

| | |
|---|---|
| other (cross-carrier scheduling) | SEQUENCE { |
| Cross carrier scheduling | |
| schedulingCellId | ServCellIndex, |
| (The cell index of a scheduling cell) | |
| cif-InSchedulingCell | INTEGER (1..7) |
| (CIF value) | |
| } | |
| }, | |
| ... | |
| } | |

The terminal may monitor a PDCCH for a cell configured by the cross-carrier scheduling, on a cell corresponding to the first cell. The terminal may determine the index of a cell scheduled by received DCI from a carrier indicator field value in a DCI format scheduling data. On the basis of the index, the terminal may transmit or receive data on the cell indicated by a carrier indicator.

The scheduled cell (cell A) and the scheduling cell (cell B) may be configured by different numerologies. Each of the numerologies may include subcarrier spacing and a cyclic prefix. In a case where the numerologies of cells A and B are different, when a PDCCH of cell B schedules a PDSCH of cell A, a minimum scheduling offset as described below may be additionally considered between the PDCCH and the PDSCH.

Cross-Carrier Scheduling Method

When the subcarrier spacing ($\mu_B$) of cell B is smaller than the subcarrier spacing ($\mu_A$) of cell A, a PDSCH may be scheduled from a PDSCH slot next to a slot after passage of X symbols from the last symbol of a PDCCH received in cell B. X may vary according to $\mu_B$, when $\mu_B$ equals to 15 kHz, X may be defined as 4 symbols, when $\mu_B$ equals 30 kHz, X may be defined as 4 symbols, and when $\mu_B$ equals 60 kHz, or X may be defined as 8 symbols.

When the subcarrier spacing ($\mu_B$) of cell B is larger than the subcarrier spacing ($\mu_A$) of cell A, a PDSCH may be scheduled from a time point corresponding to a slot after passage of X symbols from the last symbol of a PDCCH received in cell B. X may vary according to $\mu_B$, when $\mu_B$ equals to 30 kHz, X may be defined as 4 symbols, when $\mu_B$ equals to 60 kHz, X may be defined as 8 symbols, and when $\mu_B$ equals 120 kHz, X may be defined as 12 symbols.

Hereinafter, higher layer signaling may be signaling corresponding to at least one of the following signalings below, or a combination of one or more thereof.
  MIB
  SIB or SIB X (X=1, 2, . . . )
  RRC
  MAC control element CE
  UE capability reporting In addition, L1 signaling may be signaling corresponding to at least one of the physical layer channels or signaling methods below, or a combination of one or more thereof.
  PDCCH
  DCI
  UE-specific DCI
  Group common DCI
  Common DCI
  Scheduling DCI (e.g. DCI used for scheduling downlink or uplink data)
  Non-scheduling DCI (e.g. DCI for not scheduling downlink or uplink data)
  PUCCH
  uplink control information (UCI)

In order to reduce the power consumption of a terminal, 5G may support a particular serving cell (e.g. a secondary cell) to be in a dormant state, or may support the serving cell to be operated in a dormant BWP. A serving cell being operated in a dormant BWP may imply that the dormant BWP is activated for the serving cell. The dormant BWP may correspond to a BWP which has no configuration for a PDCCH or is indicated as a dormant BWP, among random BWPs configured for the terminal. In a case where a secondary cell is in a dormant state, or a dormant BWP is activated in a secondary cell, the terminal may not perform PDCCH monitoring on the cell (or intermittently monitor a PDCCH), and may consistently perform an operation, such as a channel state measurement (CSI measurement), an adaptive gain control (AGC), or a beam management. Accordingly, the terminal can largely reduce the power consumed to maintain a cell, which is not currently used but activated.

A terminal may receive, through L1 signaling and from a base station, an indicator indicating a dormant state of a secondary cell, or an indicator indicating a change to a dormant BWP (referred to as a dormancy indicator).

A dormancy indicator for a secondary cell as described above may be configured based on the following parameters.
  The dormancy indicator may be configured by a bitmap having N bits, and each of the bits of the bitmap may correspond to one secondary cell or one secondary cell group including multiple secondary cells.
  The size of the bitmap may be the same as the number of configured secondary cells or secondary cell groups.
  If 0 is indicated as one bit value of a bitmap, the terminal may switch, into a dormant state, the cell state of a secondary cell indicated by the bit, or the cell states of all secondary cells of a secondary cell group indicated thereby (or may activate a dormant BWP configured for the cell(s)).
  If 1 is indicated as one bit value of a bitmap, the terminal may switch, into an active state, the cell state of a secondary cell indicated by the bit, or the cell states of all secondary cells of a secondary cell group indicated thereby (or may activate another bandwidth rather than a dormant BWP configured for the cell(s), wherein another BWP rather than the dormant BWP, which is to be activated in response to 1 being indicated as a bit value, may be configured for the terminal through higher layer signaling from the base station).

The terminal may receive the above dormancy indicator through a particular DCI format. That is, the dormancy indicator may be transferred to the terminal through a particular DCI format. The particular DCI format may correspond to a DCI format which does not include scheduling information for data (non-scheduling DCI, e.g. this may correspond to DCI format 2_X (X=0, 1, 2, . . . ); a DCI format which can include scheduling information for data (scheduling DCI with scheduling information, e.g. this may correspond to DCI format 0_X or DCI format 1_X (X=0, 1, 2, . . . ); or a DCI format which can include scheduling information for data, but does not actually include scheduling information (scheduling DCI without scheduling information, e.g. this may correspond to DCI format 0_X or DCI format 1_x (X=0, 1, 2, . . . ). A DCI format indicating a dormancy indicator for a secondary cell, described above, may be received in a primary cell.

A DCI format including a dormancy indicator field may be configured for the terminal from the base station. In addition, a search space set configured for monitoring a PDCCH for detecting the DCI format including the dormancy indicator field may be configured for the terminal. The terminal may monitor a PDCCH in the configured search space to detect the DCI format including the dormancy indicator, and may change the BWP or the state of the secondary cell according to the contents of the dormancy indicator field obtained from the DCI format.

When a particular field value of a DCI format satisfies a particular condition A, the terminal may assume that the DCI format is a DCI format including a dormancy indicator field. For example, if a search space set is configured for the terminal to monitor a PDCCH for a particular DCI format, and a value of a frequency domain resource allocation field thereof satisfies particular condition A, the terminal may consider the DCI format as a DCI format including a dormancy indicator field. Condition A may correspond to at least one of the following eight (8) conditions below, or a combination of one or more thereof.

Condition 1

A resource allocation type (resourceAllocation) is configured to be type 0 (resourceAllocationType0), and each of the frequency domain resource allocation field values in a corresponding DCI format are 0, the resource allocation type (resourceAllocation) is configured to be type 1 (resourceAllocationType1), and each of the frequency domain resource allocation field values in the DCI format are 1, or the resource allocation type (resourceAllocation) is configured to be dynamicSwitch (or configured equally to be both type 0 and type 1), and each of the frequency domain resource allocation field values in the DCI format are 0 or 1.

Condition 2

The resource allocation type (resourceAllocation) is configured to be type 0 (resourceAllocationType0), or the resource allocation type (resourceAllocation) is configured to be dynamicSwitch (or configured equally to be both type 0 and type 1), and each of the frequency domain resource allocation field values in the DCI format are 0, or the resource allocation type (resourceAllocation) is configured to be type 1 (resourceAllocationType1), and each of the frequency domain resource allocation field values in the DCI format are 1.

Condition 3

The resource allocation type (resourceAllocation) is configured to be type 0 (resourceAllocationType0), and each of the frequency domain resource allocation field values in the DCI format are 0, or the resource allocation type (resourceAllocation) is configured to be type 1 (resourceAllocationType1), or the resource allocation type (resourceAllocation) is configured to be dynamicSwitch (or configured equally to be both type 0 and 1), and each of the frequency domain resource allocation field values in the DCI format are 1.

Condition 4

Each of the carrier indicator field values are 0.

Condition 5

A value of the carrier indicator field indicates the index of a cell configured for monitoring the DCI format.

Condition 6

A value of the carrier indicator field indicates the index of a primary cell or a secondary primary cell.

Condition 7

A DCI format identifier value is 1.

Condition 8

Each of the BWP indicator field values are 0.

In a case where a DCI format satisfies particular condition B, the terminal may determine the above condition A to determine whether the DCI format is a DCI format including a dormancy indicator. Condition B may correspond to at least one of the following two (2) conditions, below.

Condition 1

A corresponding DCI format may include a CRC scrambled by at least one of a C-RNTI or an MCS-C-RNTI.

Condition 2

The DCI format may include a CRC scrambled by at least one of a C-RNTI or an MCS-C-RNTI, and the terminal may not check condition A when the CRC of the DCI format is scrambled by a CS-RNTI.

The above DCI format may correspond to a DCI format (e.g. DCI format 1_0 or 1_1) scheduling a PDSCH. Alternatively, in the same way, the DCI format may correspond to a DCI format having a DCI format identifier field value of 1.

If the above DCI format is determined by the terminal to be a DCI format including a dormancy indicator, the terminal may consider that a combination of the following fields in the DCI format is a dormancy indicator field, the fields including a modulation and coding scheme, a new data indicator, a redundancy version, a HARQ process number, antenna port(s), and a DMRS sequence initialization.

If the above DCI format is determined by the terminal to be a DCI format including a dormancy indicator, the terminal may neglect a BWP indicator field value in the DCI format.

If the above DCI format is determined by the terminal to be a DCI format including a dormancy indicator, the terminal may change a BWP, based on a BWP indicator field value in the DCI format. The terminal may not perform any transmission or reception during a time interval from the third symbols of a slot receiving a PDCCH including the DCI to the starting point of a slot corresponding to a latency time interval ($T_{BWP}$) required for the change of the BWP. For example, if the terminal receives a DCI indicating a change of a BWP in slot n, and corresponding $T_{BWP}$ is equal to K, the terminal may not perform any transmission or reception during a time interval from the third symbol of slot n to the symbol before slot n+K (i.e. the last symbol of slot n+K−1). $T_{BWP}$ may correspond to a supportable value reported by the terminal to the base station according to the capability of the terminal.

In addition, various features described above may be carried out in combination (i.e., one after another or in parallel).

Figure 7:
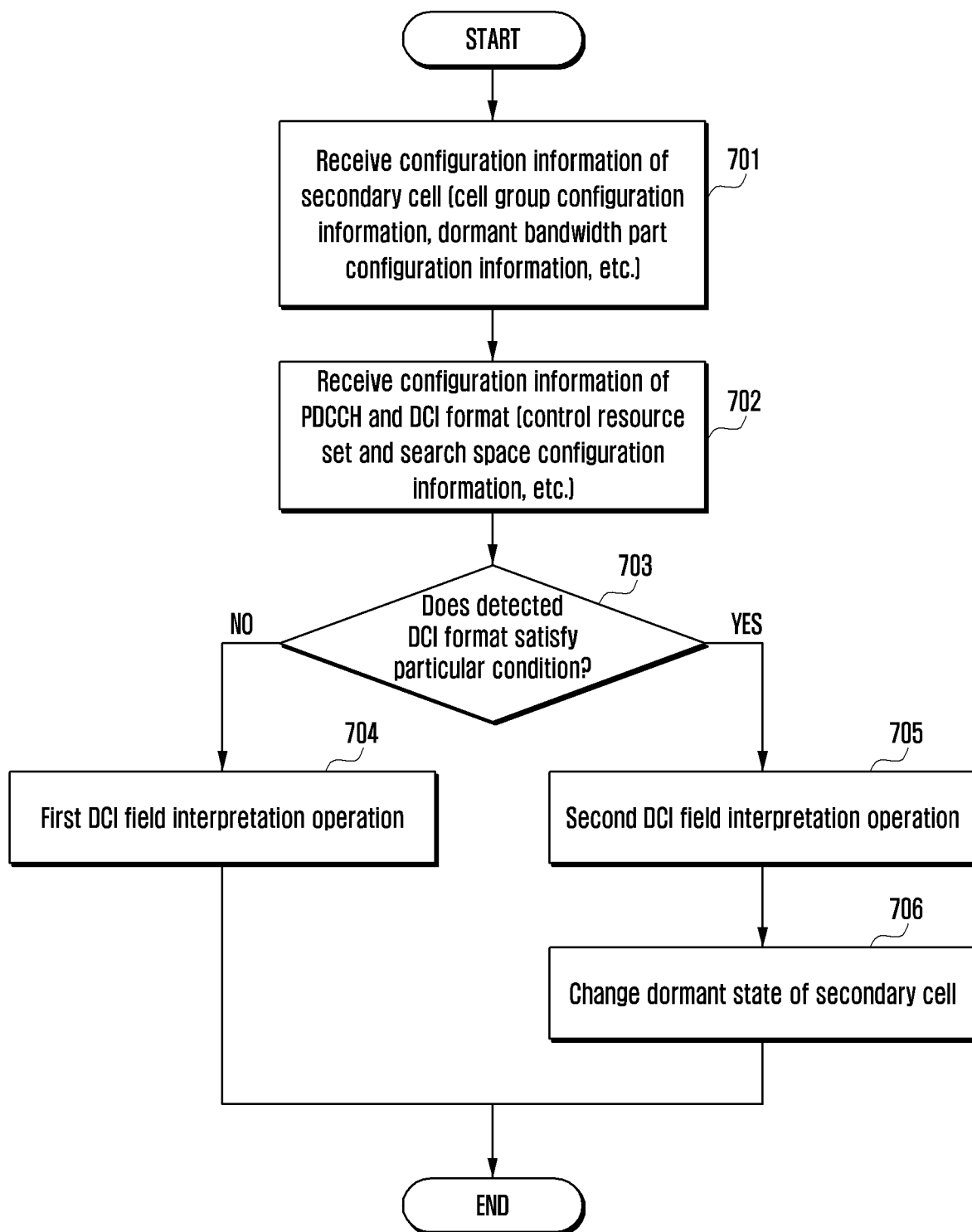
FIG. 7 illustrates a terminal operation, according to an embodiment.

FIG. 7 illustrates a terminal operation, according to an embodiment.

In step 701, a terminal receives configuration information of a secondary cell. The configuration information of the secondary cell may include configuration information defining a group for one or multiple cells, or configuration information of a dormant BWP for each secondary cell.

In step 702, the terminal receives configuration information of a PDCCH and a DCI format. The terminal may receive configuration information of a CORESET and configuration information of a search space, as a part of the PDCCH configuration information. The terminal may monitor the PDCCH on the basis of the search space configuration information, and detect a particular DCI format.

In step 703, the terminal determines whether the detected DCI format satisfies a particular condition. According to an embodiment, the particular condition may correspond to whether a dormancy indicator field is configured in the detected DCI format. According to another embodiment, the particular condition may correspond to a combination of at least some of the various conditions described above.

When it is determined in step 703 that the detected DCI format does not satisfy the particular condition, the terminal performs a first DCI field interpretation operation of the received DCI format, in step 704. The first DCI field interpretation operation may imply obtaining information according to the content of an existing field of the received DCI format. The terminal may perform a series of operations on the basis of control information of the received DCI format.

When it is determined in step 703 that the detected DCI format satisfies the particular condition, the terminal performs a second DCI field interpretation operation of the received DCI format, in step 705. The second DCI field interpretation operation may imply obtaining the content of a dormancy indicator field from the received DCI format. According to an embodiment, the terminal may obtain the content of the dormancy indicator field from the dormancy indicator field configured to be separate from the existing field. According to another embodiment, the terminal may reinterpret partial content of the existing field, consider the reinterpreted content as obtained from a dormancy indicator field, and obtain the content of the dormancy indicator field from the reinterpreted content.

In step 706, the terminal changes a dormant state of the secondary cell, based on the obtained dormancy indicator field content of secondary cell. The operation of changing the dormant state of the secondary cell may be an operation of switching the cell state into the dormant state according to the content of the dormancy indicator field (or activating a dormant BWP configured for the cell), or an operation of switching the cell state into an active state (or activating a different BWP rather than a dormant BWP configured for the cell).

Figure 8:
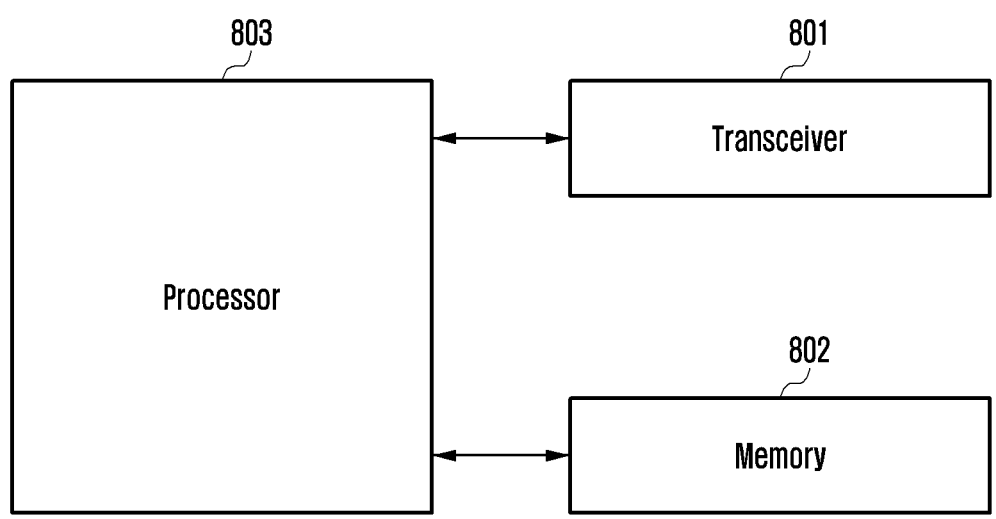
FIG. 8 is a block diagram showing a structure of a terminal, according to an embodiment.

FIG. 8 is a block diagram showing a structure of a terminal, according to an embodiment.

Referring to FIG. 8, a terminal includes a transceiver 801, a memory 802, and a processor 803. The elements of the terminal are not limited to the above example and may include more or fewer elements than the above elements. In addition, at least one or all of the transceiver 801, the memory 802, and the processor 803 may be implemented into a single chip.

The transceiver 801 may transmit or receive a signal to or from a base station. The signal may include control information and data. To this end, the transceiver 801 may include a radio frequency (RF) transmitter that up-converts and amplifies a frequency of a transmitted signal and an RF receiver that low-noise amplifies a received signal and down-converts the frequency. In addition, the transceiver 801 may receive a signal through a wireless channel and output the signal to the processor 803, and may transmit a signal output from the processor 803, through a wireless channel.

The memory 802 may store a program and data required for an operation of the terminal. In addition, the memory 802 may store control information or data included in a signal transmitted or received by the terminal. The memory 802 may be configured by a storage medium such as a read only memory (ROM), a random access memory (RAM), a hard disk, a compact disc (CD)-ROM, a digital versatile disc (DVD), or a combination of storage mediums. In addition, the memory 602 may include a plurality of memories. The memory 802 may store a program for executing an operation for power saving of the terminal.

The processor 803 may control a series of processes in which the terminal may operate according to embodiments described above. The processor 803 may execute the program stored in the memory 802, so as to control the terminal to receive configuration information of a DCI format including a dormancy indicator and a corresponding dormancy indicator field from the base station, and receive control information through a DCI; and on the basis of the received configuration information, monitor the downlink control channel to perform the first DCI field interpretation operation or the second DCI field interpretation operation according to whether a condition is satisfied.

Figure 9:
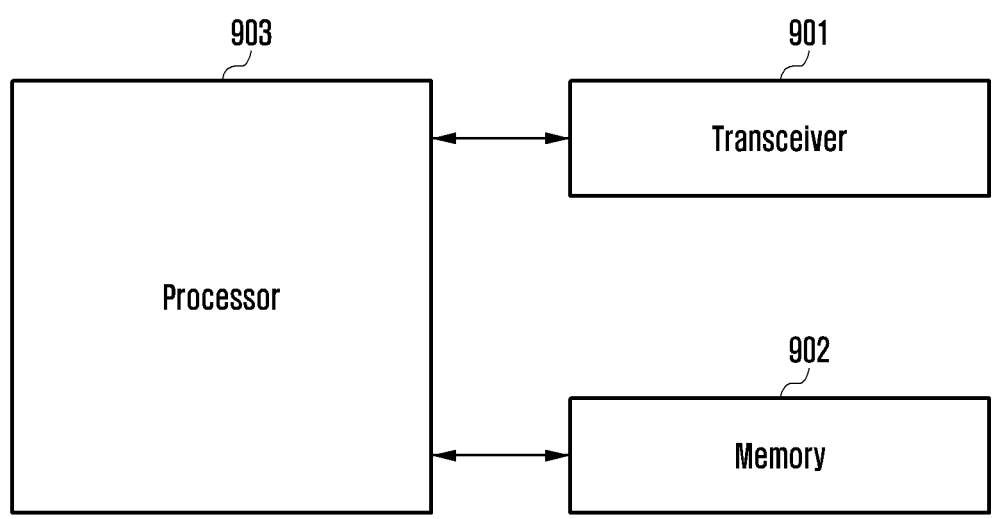
FIG. 9 is a block diagram showing a structure of a base station, according to an embodiment.

FIG. 9 is a block diagram showing a structure of a base station, according to an embodiment.

Referring to FIG. 9, the base station includes a transceiver 901, a memory 902, and a processor 903. However, the elements of the base station may include more or fewer elements than the above elements. In addition, the transceiver 901, the memory 902, and the processor 903 may be implemented into a single chip.

The transceiver 901 may transmit or receive a signal to or from a terminal. The signal may include control information and data. To this end, the transceiver 901 may include an RF transmitter that up-converts and amplifies a frequency of a transmitted signal and an RF receiver that low-noise amplifies a received signal and down-converts the frequency. In addition, the transceiver 901 may receive a signal through a wireless channel and output the signal to the processor 903, and may transmit a signal output from the processor 903, through a wireless channel.

The memory 902 may store a program and data required for an operation of the base station. In addition, the memory 902 may store control information or data included in a signal transmitted or received by the base station. The memory 902 may be configured by a storage medium such as a ROM, a RAM, a hard disk, a CD-ROM, a DVD, or a combination of storage mediums. In addition, the memory 902 may include a plurality of memories. The memory 902 may store a program for executing an operation for power saving of the terminal.

The processor 903 may control a series of processes so that the base station can operate according to embodiments described above. The processor 903 may execute the program stored in the memory 902, so as to control the base station to transmit, to the terminal, configuration information of a DCI format including a dormancy indicator and a corresponding dormancy indicator field, and transmit control information through a downlink control channel; and allow the terminal to, on the basis of the received configuration information, monitor the downlink control channel to perform the first DCI field interpretation operation or the second DCI field interpretation operation according to whether a condition is satisfied.

Methods disclosed in the claims and/or methods according to various embodiments described in the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured to be executed by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a RAM and a flash memory, a ROM, an electrically erasable programmable read only memory (EEPROM), a magnetic disc storage device, a CD-ROM, DVDs, other type optical storage devices, or a magnetic cassette. Alternatively, any combination of some or all of different types of memories may form a memory in which the program is stored. Further, a plurality of such memories may be included in the electronic device.

In addition, the programs may be stored in an attachable storage device which may access the electronic device through communication networks such as the Internet, an intranet, a local area network (LAN), a wide LAN (WLAN), and a storage area network (SAN) or a combination thereof. Such a storage device may access the electronic device via an external port. Further, a separate storage device on the communication network may access a portable electronic device.

In the above-described embodiments of the disclosure, elements may be expressed in singular or plural forms. However, a singular form or a plural form is selected appropriately to the presented situation for the convenience of description, and the disclosure is not limited by elements expressed in the singular form or the plural form. Therefore, either an element expressed in the plural may also include a single element or an element expressed in the singular may also include multiple elements.

The embodiments of the disclosure described and shown in the specification and the drawings have been presented to easily explain the technical contents of the disclosure and help understanding of the disclosure, and are not intended to limit the scope of the disclosure. That is, it will be apparent to those skilled in the art that other modifications and changes may be made thereto on the basis of the technical idea of the disclosure. Further, the above respective embodiments may be employed in combination, as necessary. For example, one embodiment of the disclosure may be partially combined with other embodiments to operate a base station and a terminal. In addition, the methods proposed in the disclosure may be partially combined to operate a base station and a terminal. Further, the embodiments of the disclosure may be applied to other communication systems, and other variants based on the technical ideas described herein. For example, embodiments of the disclosure may be applied to LTE systems, 5G or NR systems.

While the present disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed is:

1. A method performed by a terminal in a communication system, the method comprising:
    receiving, from a base station, first information for a dormant bandwidth part (BWP) configuration for a secondary cell, and second information for a resource allocation type;
    receiving, from the base station, downlink control information (DCI) format 1_1; and
    identifying the DCI format 1_1 as a secondary cell dormancy indication without a scheduling, in case that a cyclic redundancy check (CRC) of the DCI format 1_1 is scrambled by a cell radio network temporary identifier (C-RNTI) or a modulation and coding scheme (MCS)-C-RNTI, and all bits of a frequency domain resource assignment field are a specific value,
    wherein a physical downlink control channel (PDCCH) on a BWP of the secondary cell is not monitored, in case that the BWP of the secondary cell is the dormant BWP,
    wherein all bits of the frequency domain resource assignment field in the DCI format 1_1 for the secondary cell dormancy indication are equal to 0, in case that the resource allocation type is configured as type 0 based on the second information,
    wherein all bits of the frequency domain resource assignment field in the DCI format 1_1 for the secondary cell dormancy indication are equal to 1, in case that the resource allocation type is configured as type 1 based on the second information, and
    wherein all bits of the frequency domain resource assignment field in the DCI format 1_1 for the secondary cell dormancy indication are equal to 0 or 1, in case that the resource allocation type is configured as a dynamic switch based on the second information.

2. The method of claim 1, wherein information fields in the DCI format 1_1 are used as the secondary cell dormancy indication, the information fields comprising a modulation and coding scheme (MCS), a new data indicator (NDI), a redundancy version (RV), a hybrid automatic repeat request (HARD) process number, an antenna port and a demodulation reference signal (DMRS) sequence initialization.

3. The method of claim 2, wherein the secondary cell dormancy indication is a bitmap defined based on the information fields, each bit of the bitmap being associated with a secondary cell,
    wherein an active BWP is a dormant BWP for a secondary cell, in case that a bit for the secondary cell of the bitmap is 0, and
    wherein an active BWP is a BWP other than the dormant BWP for the secondary cell, in case that the bit for the secondary cell of the bitmap is 1.

4. The method of claim 1, wherein the DCI format 1_1 is identified as the secondary cell dormancy indication without scheduling, in case that a carrier indicator field (CIF) included in the DCI are equal to 0.

5. A terminal in a communication system, the terminal comprising:
    a transceiver; and
    a controller configured to:
        receive, from a base station, first information for a dormant bandwidth part (BWP) configuration for a secondary cell, and second information for a resource allocation type;
        receive, from the base station, downlink control information (DCI) format 1_1; and
        identify the DCI format 1_1 as a secondary cell dormancy indication without a scheduling, in case that a cyclic redundancy check (CRC) of the DCI format 1_1 is scrambled by a cell radio network temporary identifier (C-RNTI) or a modulation and coding scheme (MCS)-C-RNTI, and all bits of a frequency domain resource assignment field are a specific value,
    wherein a physical downlink control channel (PDCCH) on a BWP of the secondary cell is not monitored, in case that the BWP of the secondary cell is the dormant BWP,
    wherein all bits of the frequency domain resource assignment field in the DCI format 1_1 for the secondary cell dormancy indication are equal to 0, in case that the resource allocation type is configured as type 0 based on the second information, wherein all bits of the frequency domain resource assignment field in the DCI format 1_1 for the secondary cell dormancy indication are equal to 1, in case that the resource allocation type is configured as type 1 based on the second information, and wherein all bits of the frequency domain resource assignment field in the DCI format 1_1 for the secondary cell dormancy indication are equal to 0 or 1, in case that the resource allocation type is configured as a dynamic switch based on the second information.

6. The terminal of claim 5, wherein information fields in the DCI format 1_1 are used as the secondary cell dormancy indication, the information fields comprising a modulation and coding scheme (MCS), a new data indicator (NDI), a redundancy version (RV), a hybrid automatic repeat request (HARD) process number, an antenna port and a demodulation reference signal (DMRS) sequence initialization.

7. The terminal of claim 6, wherein the secondary cell dormancy indication is a bitmap defined based on the information fields, each bit of the bitmap being associated with a secondary cell,
wherein an active BWP is a dormant BWP for a secondary cell, in case that a bit for the secondary cell of the bitmap is 0, and
wherein an active BWP is a BWP other than the dormant BWP for the secondary cell, in case that the bit for the secondary cell of the bitmap is 1.

8. The terminal of claim 5, wherein the DCI format 1_1 is identified as the secondary cell dormancy indication without scheduling, in case that a carrier indicator field (CIF) included in the DCI are equal to 0.

9. A method performed by a base station in a communication system, the method comprising:
transmitting, to a terminal, first information for a dormant bandwidth part (BWP) configuration for a secondary cell, and second information for a resource allocation type; and
transmitting, to the terminal, downlink control information (DCI) format 1_1;
wherein the DCI format 1_1 is used as a secondary cell dormancy indication without scheduling to indicate the terminal not to monitor a physical downlink control channel (PDCCH) on a dormant BWP of the secondary cell, in case that a cyclic redundancy check (CRC) of the DCI format 1_1 is scrambled by a cell radio network temporary identifier (C-RNTI) or a modulation and coding scheme (MCS)-C-RNTI, and all bits of a frequency domain resource assignment field are a specific value,
wherein all bits of the frequency domain resource assignment field in the DCI format 1_1 for the secondary cell dormancy indication are equal to 0, in case that the resource allocation type is configured as type 0 based on the second information,
wherein all bits of the frequency domain resource assignment field in the DCI format 1_1 for the secondary cell dormancy indication are equal to 1, in case that the resource allocation type is configured as type 1 based on the second information, and
wherein all bits of the frequency domain resource assignment field in the DCI format 1_1 for the secondary cell dormancy indication are equal to 0 or 1, in case that the resource allocation type is configured as a dynamic switch based on the second information.

10. The method of claim 9, wherein information fields in the DCI format 1_1 are used as the secondary cell dormancy indication, the information fields comprising a modulation and coding scheme (MCS), a new data indicator (NDI), a redundancy version (RV), a hybrid automatic repeat request (HARD) process number, an antenna port and a demodulation reference signal (DMRS) sequence initialization.

11. The method of claim 10, wherein the secondary cell dormancy indication is a bitmap defined based on the information fields, each bit of the bitmap being associated with a secondary cell,
wherein an active BWP is a dormant BWP for a secondary cell, in case that a bit for the secondary cell of the bitmap is 0, and
wherein an active BWP is a BWP other than the dormant BWP for the secondary cell, in case that the bit for the secondary cell of the bitmap is 1.

12. The method of claim 9, wherein the DCI format 1_1 is identified as the secondary cell dormancy indication without scheduling, in case that a carrier indicator field (CIF) included in the DCI are equal to 0.

13. A base station in a communication system, the base station comprising:
a transceiver; and
a controller configured to:
transmit, to a terminal, first information for a dormant bandwidth part (BWP) configuration for a secondary cell, and second information for a resource allocation type; and
transmit, to the terminal, downlink control information (DCI) format 1_1,
wherein the DCI format 1_1 is used as a secondary cell dormancy indication without scheduling to indicate the terminal not to monitor a physical downlink control channel (PDCCH) on a dormant BWP of the secondary cell, in case that a cyclic redundancy check (CRC) of the DCI format 1_1 is scrambled by a cell radio network temporary identifier (C-RNTI) or a modulation and coding scheme (MCS)-C-RNTI, and all bits of a frequency domain resource assignment field are a specific value,
wherein all bits of the frequency domain resource assignment field in the DCI format 1_1 for the secondary cell dormancy indication are equal to 0, in case that the resource allocation type is configured as type 0 based on the second information,
wherein all bits of the frequency domain resource assignment field in the DCI format 1_1 for the secondary cell dormancy indication are equal to 1, in case that the resource allocation type is configured as type 1 based on the second information, and
wherein all bits of the frequency domain resource assignment field in the DCI format 1_1 for the secondary cell dormancy indication are equal to 0 or 1, in case that the resource allocation type is configured as a dynamic switch based on the second information.

14. The base station of claim 13, wherein information fields in the DCI format 1_1 are used as the secondary cell dormancy indication, the information fields comprising a modulation and coding scheme (MCS), a new data indicator (NDI), a redundancy version (RV), a hybrid automatic repeat request (HARD) process number, an antenna port and a demodulation reference signal (DMRS) sequence initialization.

15. The base station of claim 14, wherein the secondary cell dormancy indication is a bitmap defined based on the information fields, each bit of the bitmap being associated with a secondary cell, wherein an active BWP is a dormant BWP for a secondary cell, in case that a bit for the secondary cell of the bitmap is 0, and wherein an active BWP is a BWP other than the dormant BWP for the secondary cell, in case that the bit for the secondary cell of the bitmap is 1.

16. The base station of claim 13, wherein the DCI format 1_1 is identified as the secondary cell dormancy indication without scheduling, in case that a carrier indicator field (CIF) included in the DCI are equal to 0.

* * * * *

UNITED STATES PATENT AND TRADEMARK OFFICE
CERTIFICATE OF CORRECTION

Page 1 of 1

PATENT NO. : 11,503,542 B2
APPLICATION NO. : 17/130714
DATED : November 15, 2022
INVENTOR(S) : Taehyoung Kim et al.

It is certified that error appears in the above-identified patent and that said Letters Patent is hereby corrected as shown below:

In the Claims

In Column 38, Line 25, in Claim 2:
"(HARD) process number, an antenna port and a demodula-"
Should be:
-- (HARQ) process number, an antenna port and a demodula- --

In Column 39, Line 16, in Claim 6:
"(HARD) process number, an antenna port and a demodula-"
Should be:
-- (HARQ) process number, an antenna port and a demodula- --

In Column 40, Line 3, in Claim 10:
"(HARD) process number, an antenna port and a demodula-"
Should be:
-- (HARQ) process number, an antenna port and a demodula- --

In Column 40, Line 59, in Claim 14:
"repeat request (HARD) process number, an antenna port and"
Should be:
-- repeat request (HARQ) process number, an antenna port and- --

Signed and Sealed this
Twenty-fifth Day of March, 2025

Coke Morgan Stewart
*Acting Director of the United States Patent and Trademark Office*